United States Patent [19]

Asakura et al.

[11] Patent Number: 5,017,942

[45] Date of Patent: May 21, 1991

[54] INK RIBBON CASSETTE AND RECORDING APPARATUS WHICH CAN BE LOADED WITH THE INK RIBBON CASSETTE

[75] Inventors: Osamu Asakura, Tokyo; Yoshio Uchikata, Yokohama; Kenji Kawazoe; Yuji Kanome, both of Kawasaki, all of Japan

[73] Assignee: Canon Kabushiki Kaisha, Tokyo, Japan

[21] Appl. No.: 553,370

[22] Filed: Jul. 17, 1990

Related U.S. Application Data

[63] Continuation of Ser. No. 158,671, Feb. 22, 1988, abandoned.

[30] Foreign Application Priority Data

| | | | |
|---|---|---|---|
| Feb. 27, 1987 | [JP] | Japan | 62-043091 |
| Jun. 26, 1987 | [JP] | Japan | 62-159428 |
| Dec. 4, 1987 | [JP] | Japan | 62-307326 |
| Dec. 4, 1987 | [JP] | Japan | 62-307327 |
| Dec. 4, 1987 | [JP] | Japan | 62-307328 |

[51] Int. Cl.[5] .......... G01D 15/10; B41J 35/28

[52] U.S. Cl. .......... 346/76 PH; 400/208

[58] Field of Search .......... 346/76 PH; 400/208

[56] References Cited

U.S. PATENT DOCUMENTS

| | | | |
|---|---|---|---|
| 4,563,100 | 1/1986 | Hamamichi | 400/208 |
| 4,652,154 | 3/1987 | Horiya et al. | 400/208 X |
| 4,730,780 | 3/1988 | Shimoyama . | |
| 4,750,008 | 6/1988 | Matsuura | 400/120 X |
| 4,859,097 | 9/1989 | Frerichs | 400/208 |

*Primary Examiner*—George H. Miller, Jr.

*Attorney, Agent, or Firm*—Fitzpatrick, Cella, Harper & Scinto

[57] ABSTRACT

An ink ribbon cassette which is adapted to be demountably loaded on a recording apparatus having a recording head capable of recording information on a recording medium supported by a platen, the ink ribbon cassette has the following parts: a substantially box-shaped casing constituted by an upper case and a lower case which are connected to each other at their vertical walls, the casing having a first side wall facing the platen and a second side wall opposing the first side wall, a recessed portion formed in one end of the first side wall and capable of receiving the recording head, engaging portion provided on the second side wall and adapted for engagement with retaining member on the recording apparatus, a pair of through holes constituted by pairs of apertures formed in the portions of the upper and lower cases adjacent to the first side wall, the through holes being adapted for receiving locating members on the recording apparatus so as to locate the ink ribbon cassette, and a path of an ink ribbon extended along the first side wall so as to avert from the pair of through holes. A recording apparatus which can be loaded with the ink ribbon cassette comprises a base member for carrying a stack of the ink ribbon cassettes having the described construction, a pair of locating members projected from the base member and adapted to be received in the pair of through holes, and engaging members projected from the base member and provided at their ends with claws for engagement with the engaging portion of the casing, whereby the ink ribbon cassettes of the stack are located and held by common locating members.

12 Claims, 22 Drawing Sheets

INK RIBBON CASSETTE AND RECORDING APPARATUS WHICH CAN BE LOADED WITH THE INK RIBBON CASSETTE

This application is a continuation of application Ser. No. 07/158,671 filed Feb. 22, 1988, now abandoned.

BACKGROUND OF THE INVENTION

1. Field of the Invention

The present invention relates, to an ink ribbon cassette which is designed to be detachably loaded in a recording apparatus having a recording head, such as a printer and a facsimile. The invention also relates to a recording apparatus which can be loaded with such an ink ribbon cassette.

2. Related Background Art

Known recording apparatus of the type mentioned above usually has an ink ribbon cassette detachably loaded on a carriage which also carries a recording head and moves to the left and right along a platen. In general, the ink ribbon cassette has an ink ribbon supplied by a supply reel and taken up by a take-up reel. In operation, the ink ribbon is fed along an ink ribbon path, which is in front of the recording head, so as to be taken up by the take-up reel.

When the ink ribbon cassette is loaded on the carriage, the take-up reel is drivingly connected to a ribbon driving shaft provided on the carriage, so that the ink ribbon is fed in synchronization with the movement (scan) of the carriage during the recording.

This type of ink ribbon cassette is required to eliminate any dead space in the cassette so as to minimize the volume in the cassette for a given length of the ink ribbon. It is also required that the ink ribbon cassette is mounted as closely as possible to the platen, in order to minimize the stroke of the recording head's up and down motion thereby to reduce the size of the whole recording apparatus.

In recent years, the multi-color recording apparatus finding spreading use are those having a plurality of ink ribbon cassettes stacked in stages. The design of this type of recording apparatus has encountered difficulty in using ink cassettes of the same design and size for all stages of the ink ribbon. In addition, the size of the whole apparatus is inevitably increased due to the use of such a stack of ink ribbon cassettes.

Ink ribbon cassettes are also required to smoothly feed the ink ribbon Without any looseness or slack. In other words, it is essential that a suitable level of tension is applied to the ink ribbon during the feeding thereof.

The conventional ink ribbon cassette, however, tends to allow the ink ribbon to become slack, particularly at the portion in the vicinity of the reading head when an acceleration, deceleration or other impact results from dynamic motion of the movable parts, such as up and down motion of the recording head, reversing of the carriage, and vertical shifting of the stack of ink ribbon cassettes in the multi-color recording apparatus. Such a slack of the ink ribbon may cause a jam of the apparatus with the ink ribbon, resulting in a recording failure.

The ink ribbon cassette should be designed and constructed to allow the ink ribbon to be precisely fed without any looseness or slack. This essentially requires that the ink ribbon is taken up by a constant tension.

In the known ink ribbon cassettes, the means for maintaining tension on the ink ribbon is comprised of a friction pad which is resiliently pressed onto the ink ribbon. This type of tensioning means provides an equal level of frictional resistance against forward movement, i.e., the movement in the take-up or feeding direction and backward movement of the ink ribbon. Therefore, it has been often experienced that the ink ribbon is moved backward when an impact is applied due to, for example, up and down motion of the recording head, with the result that the ink ribbon undesirably comes off the predetermined path of feed of the ink ribbon.

The friction pad is usually supported by a leaf spring having a considerably large length such that the tensioning means requires a considerably large space for the installation thereof.

The multi-color recording apparatus making use of an ink sheet (including ink ribbon) is generally sorted into the following types: a first type in which a plurality of ink ribbon cassettes each having a ribbon of the required color are stacked one on another; a second type in which a wide ribbon having a width which is equal to the product of the recording line width and the different colors are arranged is in such a manner that the ribbon is striped, that is, with a plurality of regions parallel to the longitudinal or feeding direction of the ribbon such that the respective regions have different colors; and a third type in which a narrow ink ribbon having a width corresponding to the recording line width is sectioned in the longitudinal direction thereof such that sections of different colors are successively formed on the ribbon.

When a multi-color ink sheet is used, it is necessary to provide a suitable detecting means capable of detecting what color is set in the recording position.

A conventional detecting means includes a color sensor disposed upstream of the recording position. This type of detecting means, however, has a drawback in that, when a a portion of the ink ribbon of a specific color is sensed, the sensed portion has not reached yet the recording position. Thus, the recording system employing this type of sensor essentially requires that the ink sheet (ribbon) is fed wastefully to bring the sensed portion of the ink ribbon to the recording position.

More practically, when this type of sensing means is used, a control is conducted such as to feed the ink ribbon precisely by an amount which corresponds to the distance between the position where the color sensor is located and the recording position or, alternatively, when a delicate control of the ink ribbon feed is impossible, the ink ribbon is roughly fed by an amount which is considered sufficient for bringing the sensed portion of the ink ribbon to the recording position.

Thus, the recording apparatus employing the known multi-color ink ribbon encounters difficulty in precisely and promptly bringing the desired color to the recording position. In addition, it is very difficult to detect any erroneous feeding, e.g., such an error that a portion of an image to recorded in a color A is wrongly recorded in another color B.

SUMMARY OF THE INVENTION

Accordingly, an object of the present invention is to provide an ink ribbon cassette which is capable of reducing the size of the cassette itself and the size of a recording apparatus to be loaded with this cassette, and which is suitable for realizing a multi-color recording apparatus in which a plurality of ink ribbon cassettes of the same design and shape having ink ribbons of different colors are stacked, as well as a recording apparatus which can be loaded with such a cassette.

To this end, according to the present invention, there is provided an ink ribbon cassette which is adapted to be detachably loaded on a recording apparatus having a recording head capable of recording information on a recording medium supported by a platen, the ink ribbon cassette comprising a substantially box-shaped casing constituted by an upper case and a lower case which are connected to each other at their vertical walls, the casing having a first side wall facing the platen and a second side wall opposing the first side wall, a recessed portion formed in one end of the first side wall and capable of receiving the recording head, engaging portion provided on the second side wall and adapted for engagement with retaining member on the recording apparatus, a pair of through holes constituted by pairs of apertures formed in the portions of the upper and lower cases adjacent to the first side wall, the through holes being adapted for receiving locating members on the recording apparatus so as to locate the ink ribbon cassette, and a path of an ink ribbon extended along the first side wall so as to avert from the pair of through holes.

The present invention also provides a recording apparatus for recording information on a recording medium supported by a platen by means of a recording head with an ink ribbon set on one of a plurality of ink ribbon cassettes which are stacked in stages, the recording apparatus comprising: a base member for carrying the stack of ink ribbon cassettes, each of the ink ribbon cassette comprising a substantially box-shaped casing constituted by an upper case and a lower case which are connected to each other at their vertical walls, the casing having a first side wall facing the paten and a second side wall opposing the first side wall, a recessed portion formed in one end of the first side wall and capable of receiving the recording head, engaging portion provided on the second side wall, a pair of through holes constituted by pairs of apertures formed in the portions of the upper and lower cases adjacent to the first side walls and a path of an ink ribbon extended along the first side wall so as to avert from the pair of through holes; a pair of locating members projected from the base member and adapted to be received in the pair of through holes; and engaging members projected from the base member and provided at their ends with claws for engagement with the engaging portion of the casing; whereby the ink ribbon cassettes of the stack are located and held by common locating members.

The invention also aims at providing an ink ribbon cassette which enables an ink ribbon to be fed under a moderate and constant tension without slack, as well as a recording apparatus which can be loaded with such an ink ribbon cassette.

To these ends, the present invention provides an ink ribbon cassette adapted to be detachably loaded on a recording apparatus having a recording head, comprising: a recessed portion formed along the path of feed of an ink ribbon fed from a supply end to a take-up end, the recessed portion being capable of receiving the recording head; a pair of frictioning means disposed on both sides of the recessed portion along the path of feed of the ink ribbon and capable of imparting friction to the ink ribbon; and urging means provided between the frictioning means and disposed in the path of feed of the ink ribbon so as to impart a tension to the ink ribbon.

The present invention also provides a recording apparatus for recording information on a recording medium supported by a platen by means of a recording head with an ink ribbon set on selected one of a plurality of ink ribbon cassettes which are loaded on the recording apparatus, the recording apparatus comprising: supporting means for supporting a plurality of the ink ribbon cassettes stacked one on another and capable of vertically shifting the stack of ink ribbon cassettes, each of the ink ribbon cassettes having a recessed portion formed along the path of feed of an ink ribbon fed from a supply end to a take-up end, the recessed portion being capable of receiving the recording head, a pair of frictioning means disposed on both sides of the recessed portion along the path of feed of the ink ribbon and capable of imparting friction to the ink ribbon, and urging means provided between the frictioning means and disposed in the path of feed of the ink ribbon so as to impart a tension to the ink ribbon; and driving means for driving the supporting means in the direction of stack of the ink ribbon cassettes so as to bring the selected one of the ink ribbon cassettes to a position where it faces the recording head.

It is also an object of the present invention to provide a compact ink ribbon cassette which enables an easy extraction of an ink ribbon in the feeding direction but provides resistance to the movement of the ink ribbon in the reverse direction, thereby to enable the ink ribbon to be fed precisely and to eliminate any tendency for the ink ribbon to become slack.

To this end, the present invention provides an ink ribbon cassette adapted to be detachably loaded on a recording apparatus having a recording head, comprising: a recessed portion formed along the path of fed of an ink ribbon which is fed from a supply end to a take-up end, the recessed portion being capable of receiving the recording head; and a cantilevered spring member disposed at an intermediate portion of the path of feed of the ink ribbon, the spring member being provided at its free end with a frictioning portion and is bent at its intermediate portion such that the supported end and the free end thereof face each other, so as to impart a smaller tension to the ink ribbon when the ink ribbon is fed from the supply end to the take-up end, while imparting a greater tension to the ink ribbon when the ink ribbon is moved from the take-up end towards the supply end.

It is also an object of the present invention to provide a multi-color ink ribbon cassette having a simple construction and capable of ensuring high precision in locating of a desired color portion on a multi-color ink ribbon, and capable of operating with a high degree of reliability with minimized wasteful feed of the ink ribbon while allowing easy detection of color and any error of operation. The invention also is aimed at providing a recording apparatus which can be loaded with such an ink ribbon cassette.

To these ends, according to the invention, there is provided an ink ribbon cassette usable in a recording apparatus which is capable of conducting multi-color recording with a multi-color ink, comprising: a first winding portion capable of winding the multi-color ink ribbon thereon; a second winding portion capable of winding the multi-color ink ribbon thereon; a recording operation region disposed along the path of feed of the multi-color ink ribbon from the first winding means to the second winding means, the multi-color ink ribbon undergoes recording operation when is passes through the recording operation region; a color detection region disposed downstream of the recording operation region as viewed in the direction of feed of the multi-color ink ribbon and for enabling the color of the portion of the multi-color ink ribbon which is in the recording operation region; and driven portion which receives a driving power for feeding the multi-color ink ribbon.

The invention also provides a recording apparatus which can be loaded with a multi-color ink ribbon cassette having a multi-color ink ribbon, comprising: a cassette loading portion which can be loaded with the ink ribbon cassette, the multi-color ink ribbon cassette including a first winding portion capable of winding the multi-color ink ribbon thereon, a second winding portion capable of winding the multi-color ink ribbon thereon, a recording operation region disposed along the path of feed of the multi-color ink ribbon from the first winding means to the second winding means, the multi-color ink ribbon undergoes recording operation when is passes through the recording operation region, a color detection region disposed downstream of the recording operation region as viewed in the direction of feed of the multi-color ink ribbon and for enabling the color of the portion of the multi-color ink ribbon which is in the recording operation region, and driven portion which receives a driving power for feeding the multi-color ink ribbon; recording means disposed such as to face the recording operation region of the ink ribbon cassette when the ink ribbon cassette is loaded on the cassette loading portion; color detection means disposed such as to face the color detection region of the ink ribbon cassette when the ink ribbon cassette is loaded on the cassette loading portion so as to detect the color of the portion of the multi-color ink ribbon in the recording operation region; and power transmission means capable of transmitting the driving power to the driven portion of the ink ribbon cassette when the ink ribbon cassette is loaded on the cassette loading portion.

The above and other objects, features and advantages of the present invention will become clear from the following description of the preferred embodiments when the same is read in conjunction with the accompanying drawings.

DESCRIPTION OF THE PREFERRED EMBODIMENTS

Preferred embodiments of the present invention will be described hereinunder with reference to the accompanying drawings.

Figure 2:
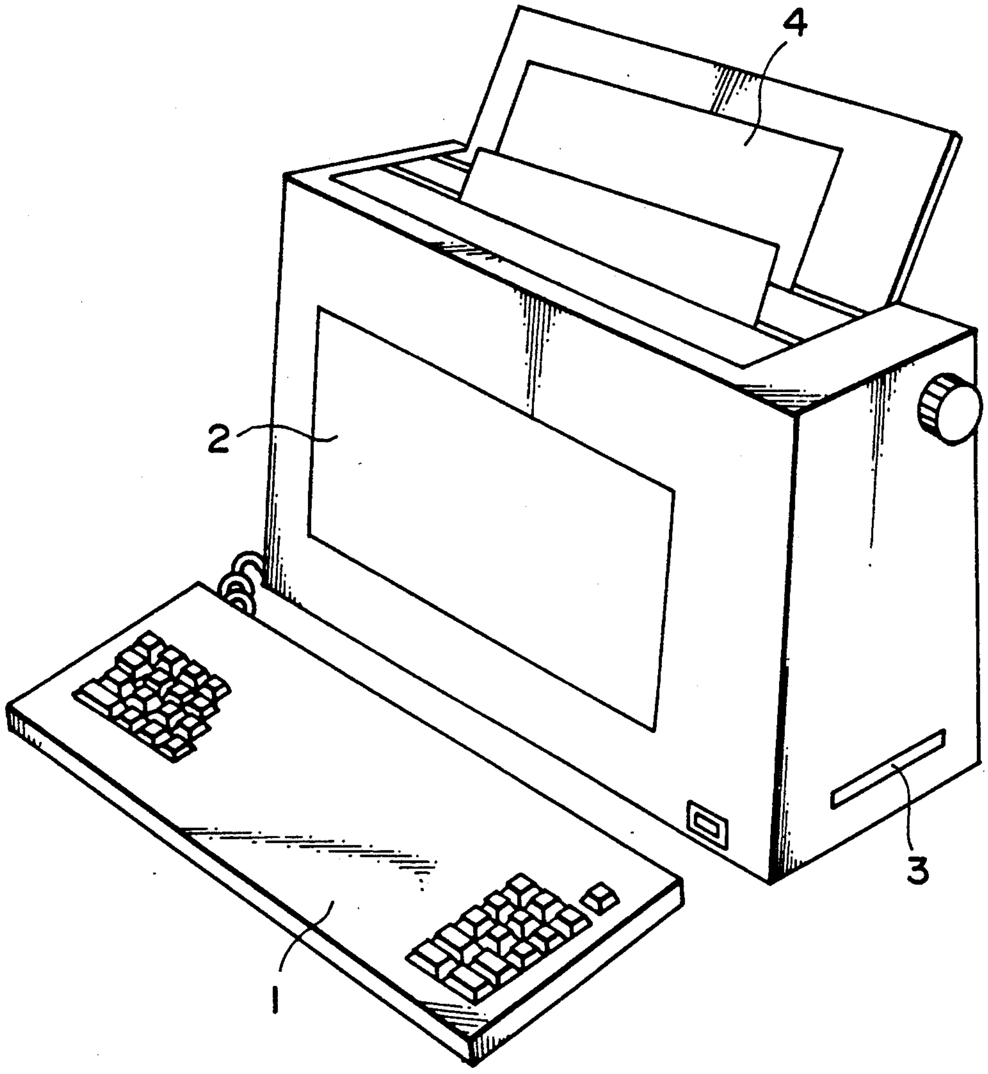
FIG. 2 is a perspective view of a word processor having a recording apparatus in accordance with the present invention.

Referring first to FIG. 2 illustrating a word processor having a recording apparatus in accordance with the present invention, a keyboard 1 serving as an input operation section has color keys and function keys which will be described later. The word processor also has a CRT (or an LCD) serving as a display device, an FDD for a memory device, and a recording sheet 4.

Figure 3:
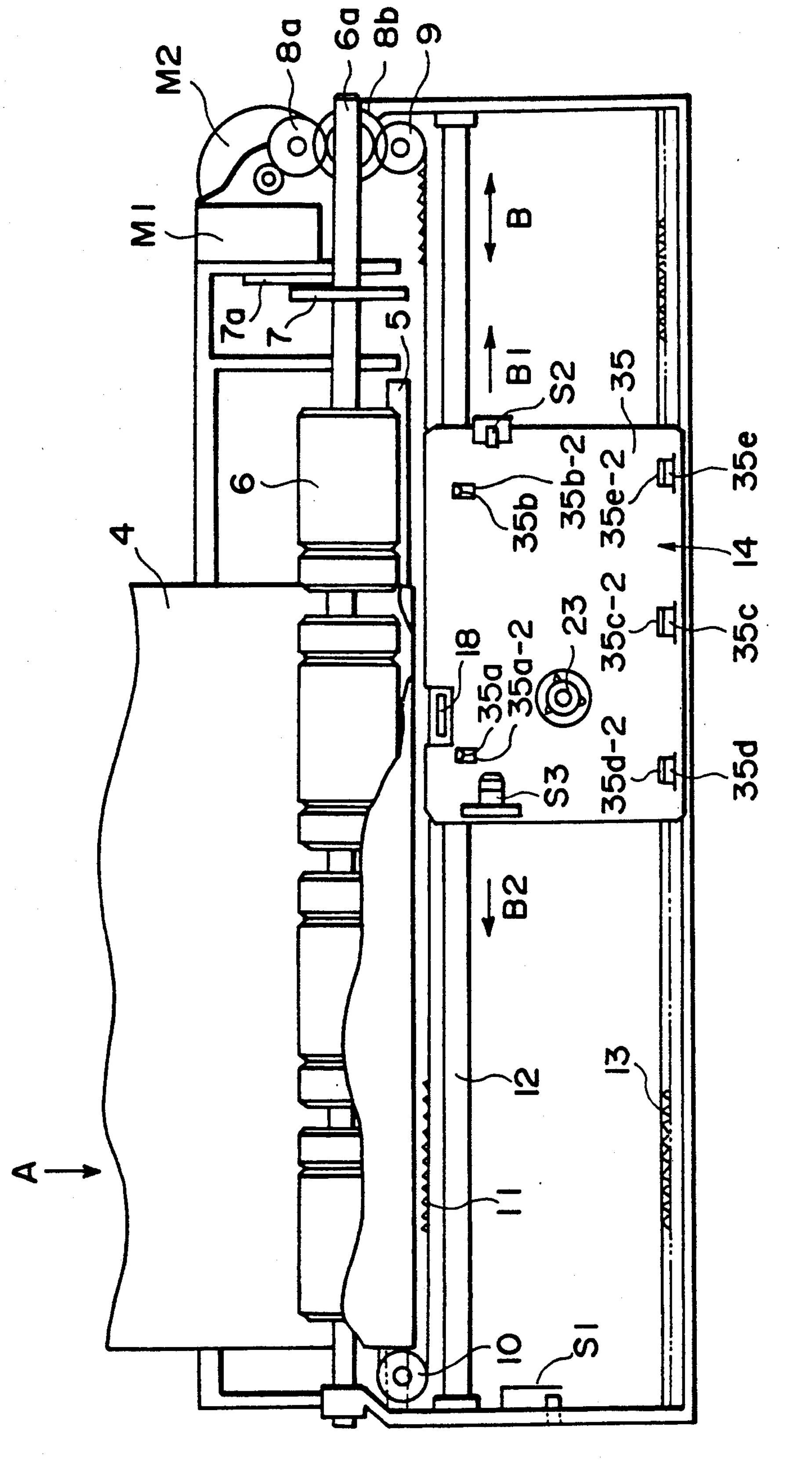
FIG. 3 is a plan view of a recording apparatus of the present invention.
Figure 6:
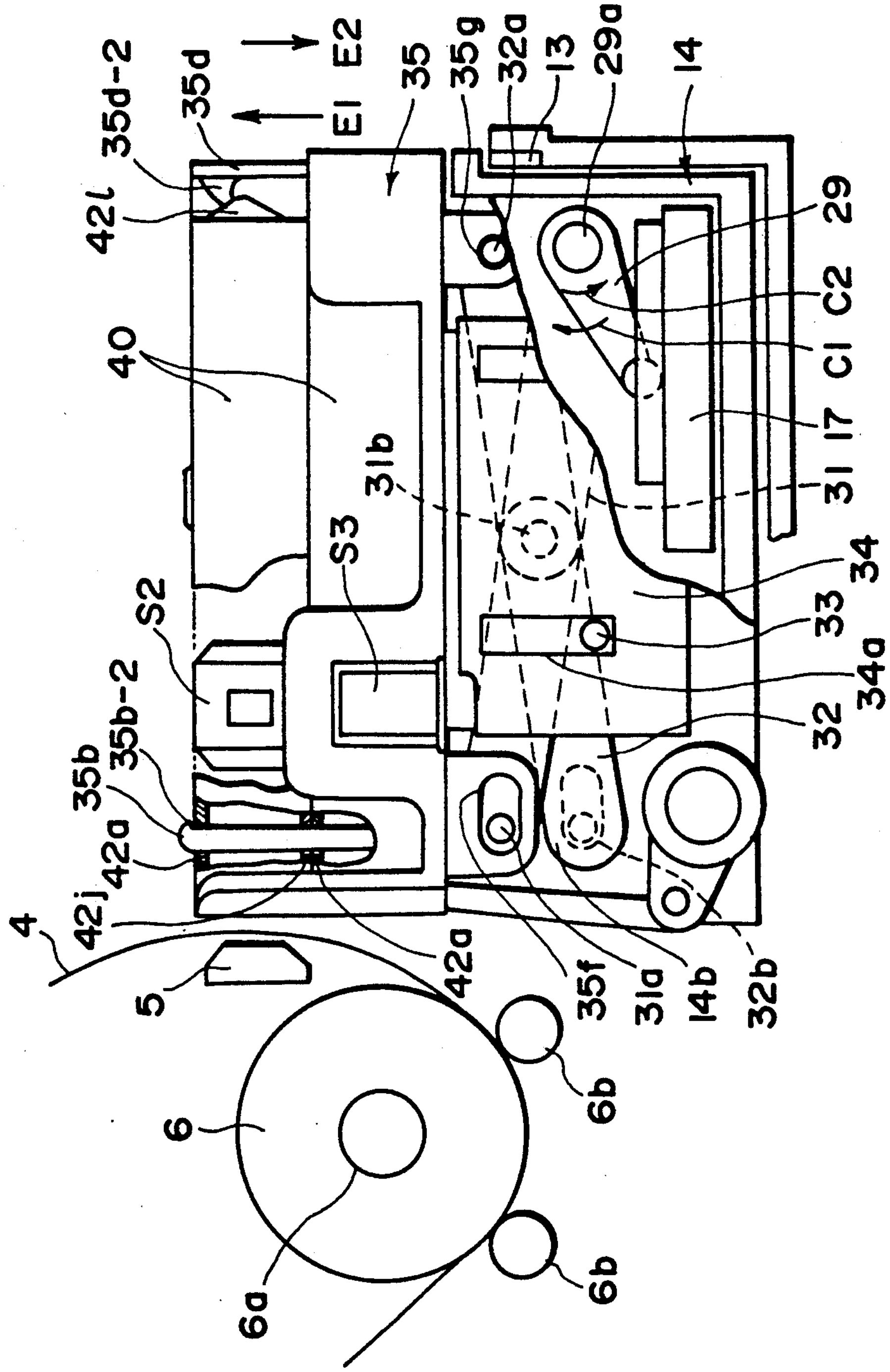
FIG. 6 is a side elevational view of the cassette up/-down mechanism of FIG. 5 in a cassette-down state.

Referring now to FIG. 3 showing the construction of a recording section of a recording apparatus in accordance with the present invention, a recording sheet 4 is backed-up by a platen 5 and is pressed onto a rubber portion of a sheet feed roller 6 by means of a pinch roller 6*b* (see FIG. 6). The sheet feed roller 6 is carried by a shaft 6*a* which is provided with a gear 7 which is engagingly connected to the rotor shaft of a sheet feed motor M1 through a reduction gear 7*a*. As the motor M1 operates, the sheet feed roller 6 is driven to feed the recording sheet 4 forwardly.

Therefore, when a later-mentioned thermal head 18 contacts the recording sheet 4 to effect the recording, the platen 5 securely holds recording sheet at the instant position.

The recording apparatus has a carriage 14 which is adapted to reciprocally move in a manner which will be explained hereinunder.

The recording apparatus has a shaft 12 extending in parallel with the platen 5 at the front side of the latter. A rack 13 extends in parallel with the shaft 12 along the end of the carriage 14 opposite to the end where the shaft 12 extends. As will be seen also from FIGS. 1 and 6, the carriage 14 is guided and supported by the upper surfaces of the shaft 12 and the rack 13 so as to be movable in the directions indicated by a double-headed arrow B. Thus, the carriage 14 is movable in the directions which is perpendicular to the direction of path A of feed of the recording sheet 4.

A belt 11 has both ends fixed to the carriage 14 and is stretched by a pulley gear 9 and the pulley 10. The pulley gear 9 is connected to a carriage motor M2 through reduction gears 8*a* and 8*b*. As the carriage motor M2 rotates, the pulley gear and the pulley rotate so as to pull the belt 11 in one or the other direction, whereby the carriage 14 is driven along the shaft 12 as indicated by the arrow B.

The carriage 14 carries a head holder 19 (see FIG. 1) which is swingable about a head holder shaft 19*b*. The head holder 19 holds a thermal head 18 and serves also as a heat sink.

The carriage 14 also carries a carriage table 35 which is capable of mounting a stack of ink sheet cassettes (ink ribbon cassettes) 40 (see FIGS. 7 and 13)in two stages. The carriage table 35 is provided with a color detection means (color sensor S3) for discriminating the color of a multi-color ribbon 50 (see FIG. 15). The carriage 14 also is provided with a ribbon sensor S2 (see FIG. 3) capable of detecting the presence of the ribbon cassette 40, as well as the type of ink and the end of the ink ribbon 49.

The carriage table 35 is detachably loaded with the stack of ink ribbon cassettes 40 in a manner which will be described hereinunder. As described before, the carriage table 35 can be loaded with a pair of ink ribbon cassettes in two stages, i.e., one on the other. The carriage table 35 is provided on the upper surface thereof with pins 35*a*, 35*b* and hooks 35*c*, 35*d*, 35*e*.

The height of the pins 35*a*, 35*b* as measured from the surface of the carriage table 35 is determined to be slightly greater than the total thickness of the stack of the pair of ink ribbon cassettes 40. The pins 35*a* and 35*b* are provided at the upper ends thereof with claws 35*a*-2 35*b*-2 formed integrally therewith in such a manner as to project towards the hooks 35*c*, 35*d* and 35*e*, in order to retain the upper surface of the upper ink ribbon cassette 40.

The hooks 35*c*, 35*d* and 35*e* are provided at their upper ends with claws 35*c*-2, 35*d*-2 and 35*e*-2 formed integrally therewith so as to project towards the pins 35*a* and 35*b*. The length of the hook 35*c* is about half that of the hooks 35*d*, 35*e* so that the claw 35*c*-2 of the hook 35*c* engages with an engaging portion 42*k* of the lower cassette 40. The claws 35*d*-2 and 35*e*-2 of the hooks 35*d* and 35*e* are capable of engaging with engaging portions 42*l* and 42*m* of the upper cassette (only the engaging portion 42*l* is shown).

For setting the ink ribbon cassette 40 which constitutes the lower stage of the stack, the ink ribbon cassette 40 is placed such that the pins 35*a*, 35*b* are received in apertures 41*a*, 41*b*, 42*i* and 42*j* formed in the upper and lower cases of the ink ribbon cassette 40 (see FIGS. 13 and 14), and the claw 35*c*-2 of the upper hook 35*c* is made to resiliently engage with a triangular engaging portion 42*k* of the lower case, whereby the ink ribbon cassette 40 is demountably set on the carriage table 35.

Once the ink ribbon cassette 40 of the lower stage is set as described, this ink ribbon cassette 40 is fixed against movement in all horizontal directions by the pins 35*a*, 35*b* and the hook 35*c*, while the vertical movement of the same is prevented solely by the hook 35*c*. Thus, the vertical movement of the ink ribbon cassette is not perfectly prohibited but, rather, the end of the cassette facing the platen 5 is allowed to move up and down.

The setting of the ink ribbon cassette 40 which constitutes the upper stage of the stack can be conducted in the same manner. Namely, the pins 35*a*, 35*b* are received in the apertures 41*a*, 41*b*, 42*i*, 42*j* and the claws 35*d*-2, 35*e*-2 of the hooks 35*d* and 35*e* are made to resiliently engage with the engaging portions 42*l* and 42*m*, whereby the ink ribbon cassette 40 of the upper stage is loaded on the carriage table 35 through the intermediary of the ink ribbon cassette 40 of the lower stage. In this state, the ribbon cassette 40 of the upper stage is prevented from moving in any horizontal direction by the presence of the pins 35*a*, 35*b* and the hooks 35*d*, 35*e*, and is fixed against vertical movement by the claws 35*a*-2, 35*b*-2 of the pins 35*a*, 35*b* and the claws 35*d*-2, 35*e*-2 of the hooks 35*d*,35*e*.

It will be understood that the ink ribbon cassette 40 of the upper stage thus retained effectively fix the stack of the ink ribbon cassettes against movement in all horizontal directions, as well as in the vertical direction.

Figure 1:
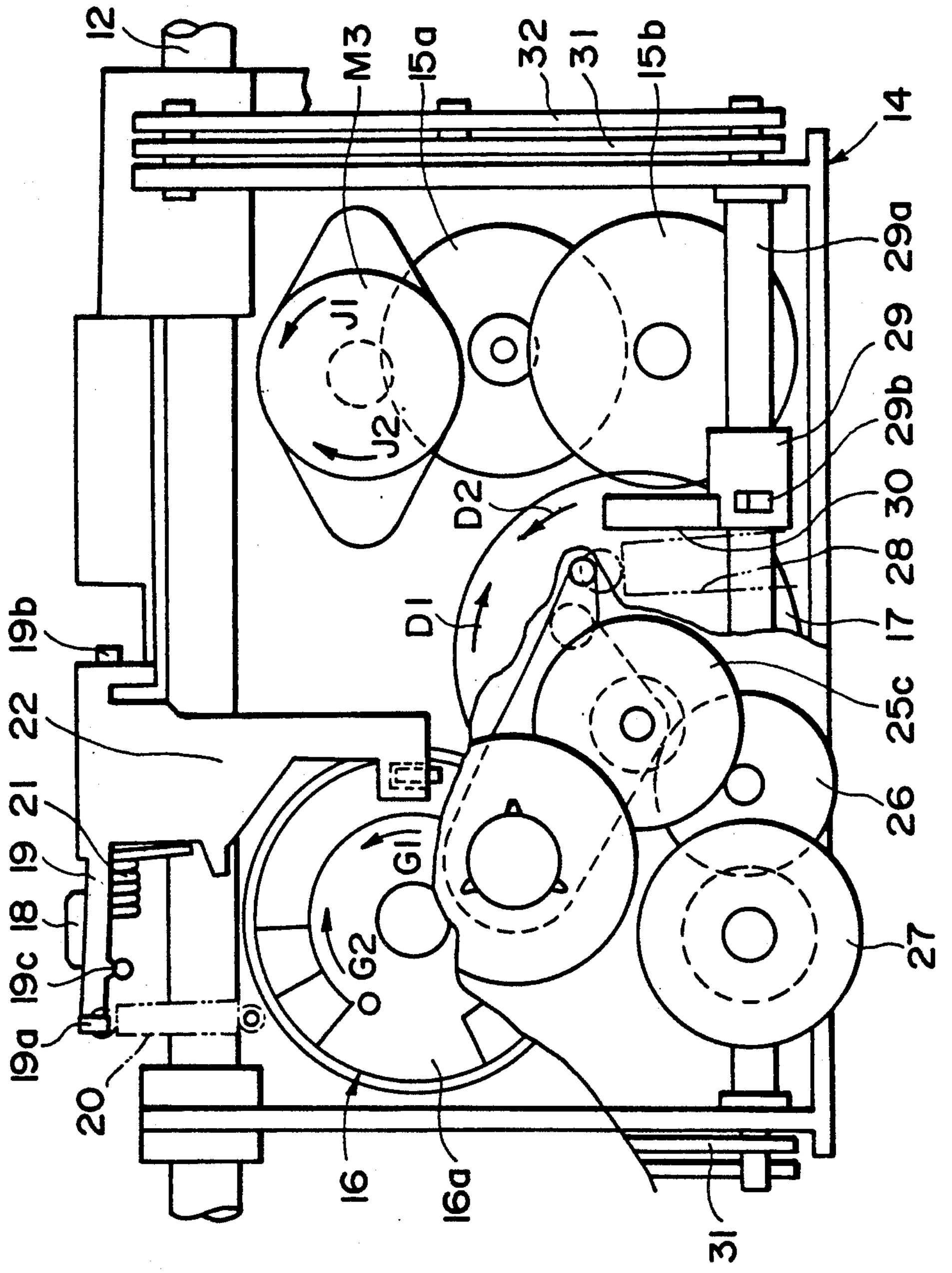
FIG. 1 is a partly-sectioned plan view of a carriage in a recording apparatus embodying the present invention.

A description will be made hereinunder as to the arrangement of parts on the carriage 14. Referring to FIG. 1 showing the whole of the carriage 14, a head motor M3 carried by the carriage 14 drives a head cam 16 and a ribbon cam 17 through reduction gears 15*a* and 15*b*.

The head cam 16 is intended for effecting a head up/down motion for moving the recording head 18 away from and towards the platen 5. The head cam 16 is provided on the upper surface thereof with a cam contour which presents a cam surface 16*a* the lift of which varies in the direction of rotation of the head cam 16. On the other hand, the ribbon cam 17 is intended for controlling a later-mentioned operation for taking up the ribbon, as well as for effecting cassette up/down motion, i.e., operation for effecting switching between different colors of the ink sheet. As will be seen from FIG. 5, the top surface of the ribbon cam 17 is provided with a cassette up/down cam surface 17*a* the lift of which varies in the direction of axis of rotation of the ribbon cam 17. On the upper side of the cam surface 17*a* is there provided a ribbon take-up cam surface 17*b* the lift of which varies in the direction perpendicular to the axis of rotation of the ink ribbon cam 17, i.e., in the radial direction about the axis of rotation.

Figure 4:
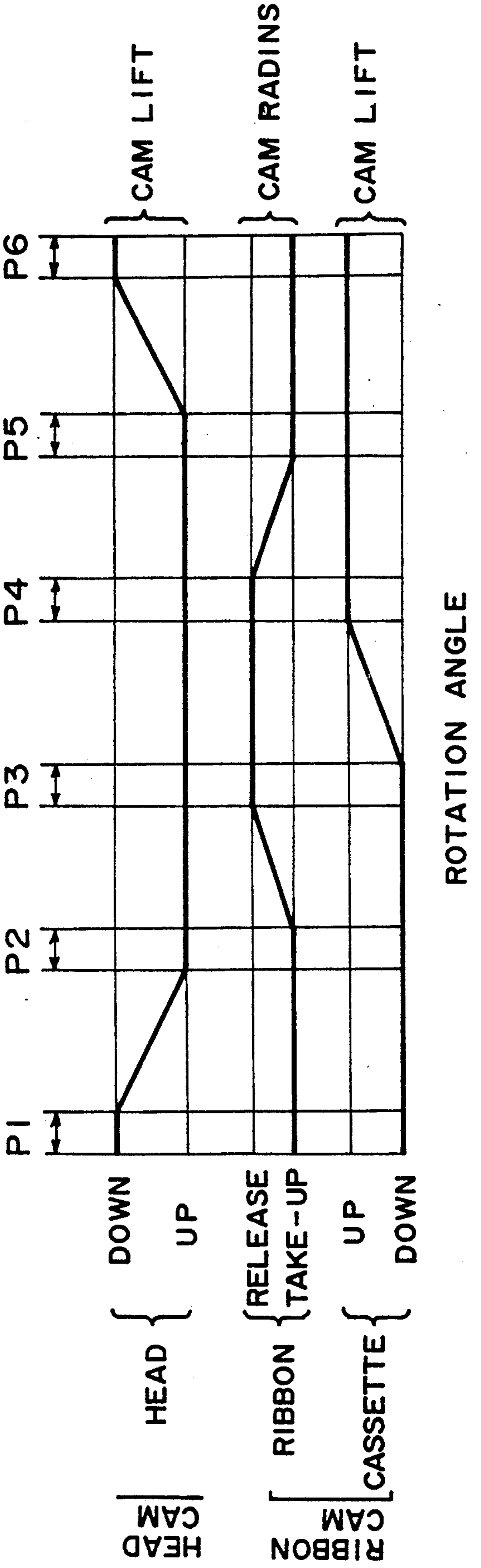
FIG. 4 is a cam chart illustrating the operation of a cam on the carriage shown in FIG. 1.

FIGS. 4 is a cam chart illustrating the phases of the head cam 16 and the ribbon cam 17 during operation thereof. As will be seen from this Figure, there are six types of combination of the head up/down operation, ribbon take-up operation and the cassette up/down operation, by suitably selecting the phases of rotation of the head cam 16 and the ribbon cam 17 which are driven by the head motor(See FIG. 1) M3.

The rotational angles of the head cam 16 and the ribbon cam 17 are limited to fall within the ranges shown in the cam chart of FIG. 4, by means of stoppers (not shown) provided on the carriage 14.

More specifically, referring to FIG. 4, the lower portion of the cam surface 16*a* of the head cam 16 is presented throughout positions P2 to P5 so as to realize a later-mentioned head-up state . i.e., a state in which the head is lifted and kept away from the platen, whereas, when in positions P6 and P1, the head cam 16 presents a higher portion of the cam surface 16*a* so as to realize a head-down state, i.e., a state in which the head has come down to press the platen.

In the positions P1 to P2 and P5 to P6, the portion of the cam surface 17*b* of the ribbon cam 17 having a small radius is presented so as to realize a later-mentioned ribbon take-up state, whereas, in the positions P3 and P4, the greater radius portion of the cam surface 17*b* is presented so as to realize a later-mentioned ribbon take-up dismissing state.

In the positions P1 to P3, the cassette up/down cam surface 17*a* of the ribbon cam 17 presents its lower lift portion so as to realize a later-mentioned cassette-down state in which the cassette of the upper stage is set in the recording position, whereas, in the positions P4 to P6, the cassette up/down cam surface 17*a* of the ribbon cam 17 presents its high lift portion so as to realize a later-mentioned cassette-up state in which the cassette of the lower stage is set in the recording position.

A description will be made hereinunder as to the cassette up-down mechanism which also constitute an ink sheet change-over means.

Figure 5:
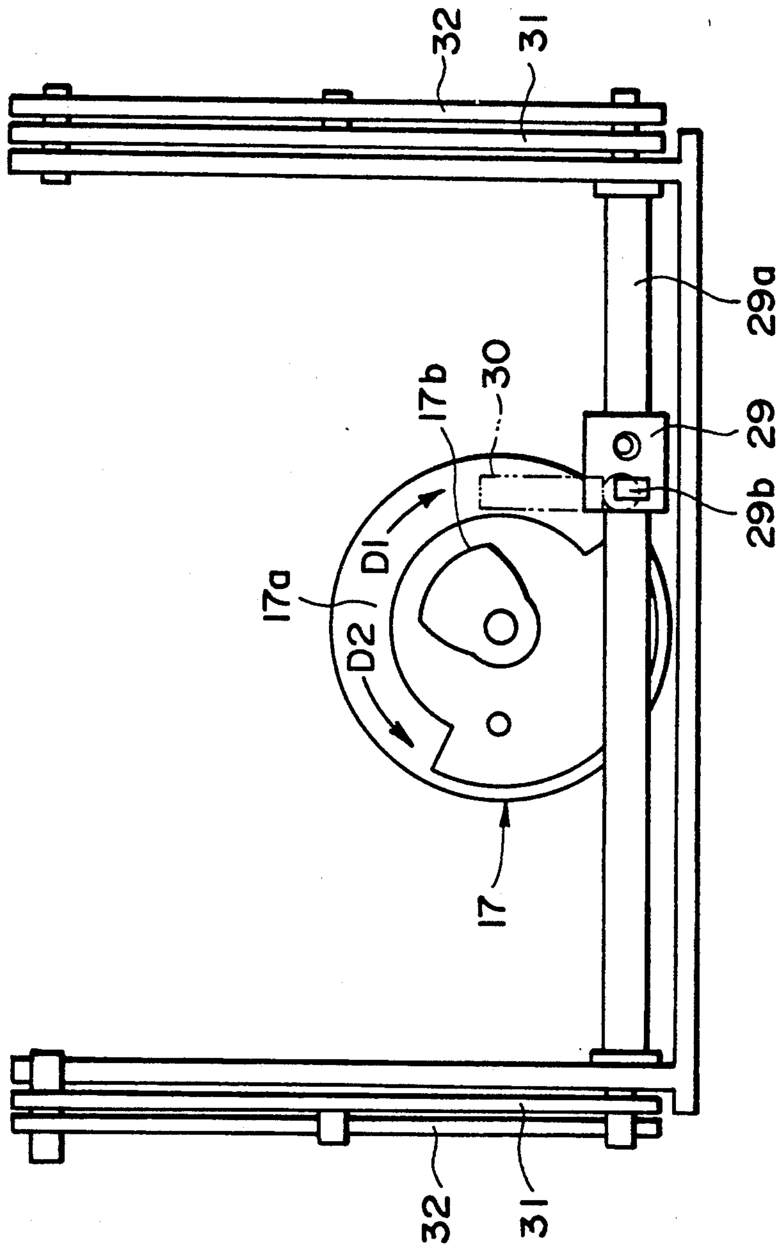
FIG. 5 is a plan view of a cassette up/down mechanism shown in FIG. 1.
Figure 7:
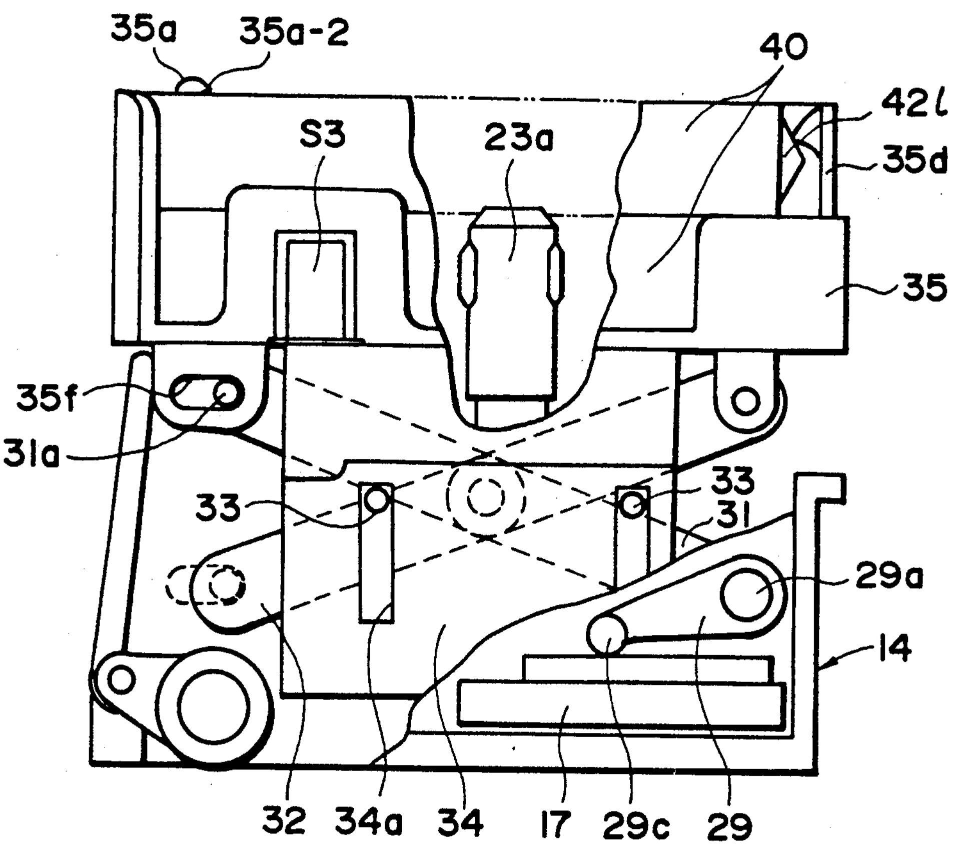
FIG. 7 is aside elevational view of the cassette up/-down mechanism of FIG. 5 in a cassette-up state.

FIG. 5 is a plan view of the cassette up/down mechanism. FIGS. 6 and 7 show, respectively, the side elevation of the cassette up/down mechanism in cassette-down and cassette-up states, respectively.

Referring to FIGS. 5, 6 and 7, a cassette shift lever 29, is fixed to a cassette shift shaft 29*a* which is rotatably guided and supported on the carriage 14.

A cassette shift spring 30 is loaded between a lug 29*b* on the cassette shift lever 29 and a lug (not shown) on the carriage 14.

The end 29*c* of the cassette shift lever 29 is urged by the force of the cassette shift spring 30 in the direction indicated by an arrow C2, so that it resiliently contacts the cam surface 17*a* of the ribbon cam 17 (see FIG. 6).

The cassette shift lever 29 is connected through the cassette shift shaft 29*a* to another cassette shift lever 31. The cassette shift lever 31 is provided with a boss 31*b* which rotatably carries still another cassette shift lever 32.

The cassette shift lever 31 is provided at its one end with a boss 31*a*, while the cassette shift lever 32 is provided at its one end with a boss 32*a*. These bosses 31*a* and 32*a* are received in apertures 35*f* and 35*g* formed in the carriage table 35. Another boss 32*b* formed on the other end of the cassette shift lever 32 is received in the aperture 14*b* formed in the carriage 14. With this arrangement, it is possible to maintain the carriage table 35 substantially horizontally.

When the lift presented by the cam surface 17*a* becomes large, the cassette shift lever 29 is rotated clockwise as viewed in FIG. 6 as indicated by an arrow C1, with the result that the cassette shift lever 31 also is rotated clockwise in FIG. 6 as indicated by the same arrow C1.

As will be understood from the foregoing description, the vertical position of the center of rotation of the cassette lever 31, i.e., the cassette shifted shaft 29*a* and the boss 32*b* are restricted by the carriage 14 so that the boss 31*a* of the cassette shift lever 31 and the boss 32*b* of the cassette shift lever 32 move within the aperture 35*f* in the carriage table 35 and the aperture 14*b* in the carriage 14, respectively. Thus, the carriage table 35 is moved up and down as indicated by arrows E1 and E2 in FIG. 6, by a pantograph mechanism which converts a rotary motion into a linear motion.

The carriage table 35 is provided with a boss 33 which is received in an aperture 34*a* formed in a carriage cover 34 attached to the carriage 14, whereby the stroke of the vertical movement of the carriage table 35 in the directions of arrows E1 and E2 is limited. That is, the stroke ends of the up/down motion of the carriage table 35 is strictly limited by the engagement between the boss 33 and the upper and lower edges of the aperture 34*a*.

A description will be made hereinunder as to the cassette up/down operation, i.e., the operation for effecting switching between different colors on the ink sheet (or ink ribbon).

FIGS. 5 and 6 illustrate the states of various parts in the cassette-down state, i.e., the state in which the ink sheet cassette of the upper stage is set at the recording position.

In this state, the ribbon cam 17 is set in a phase corresponding to the positions P1 to P3 in FIG. 4. Namely, the end 29*c* of the cassette shift lever 29 is resiliently pressed onto the small lift portion of the ribbon cam 17*a* of the ribbon cam 17 by the fore of the cassette shift spring 30 so that the carriage table 35 is held in the cassette-down position.

Then, as the ribbon cam 17 is rotated clockwise as indicated by an arrow D1 as shown in FIG. 5, the position of contact between the cam surface 17*a* of the ribbon cam 17 and the end 29*c* of the cassette shift lever 29 is progressively raised in the direction perpendicular to the cam surface.

Consequently, the cassette shift lever 29 is rotated clockwise as viewed in FIG. 6 (see arrow C1) against the force of the cassette shift spring 30.

As explained before, the rotation of the cassette lever 29 causes the carriage table 35 to move upward as indicated by the arrow E1 (see FIG. 6). When the lift of the cam surface 17*a* becomes equal to that corresponding to the positions P4 to P6 in FIG. 4, the cassette of the lower stage is set at the recording position, thus accomplishing the cassette-up state as shown in FIG. 7.

A description will be made hereinunder as to the ribbon take-up mechanism, i.e., the ink sheet feeding means.

Figure 8:
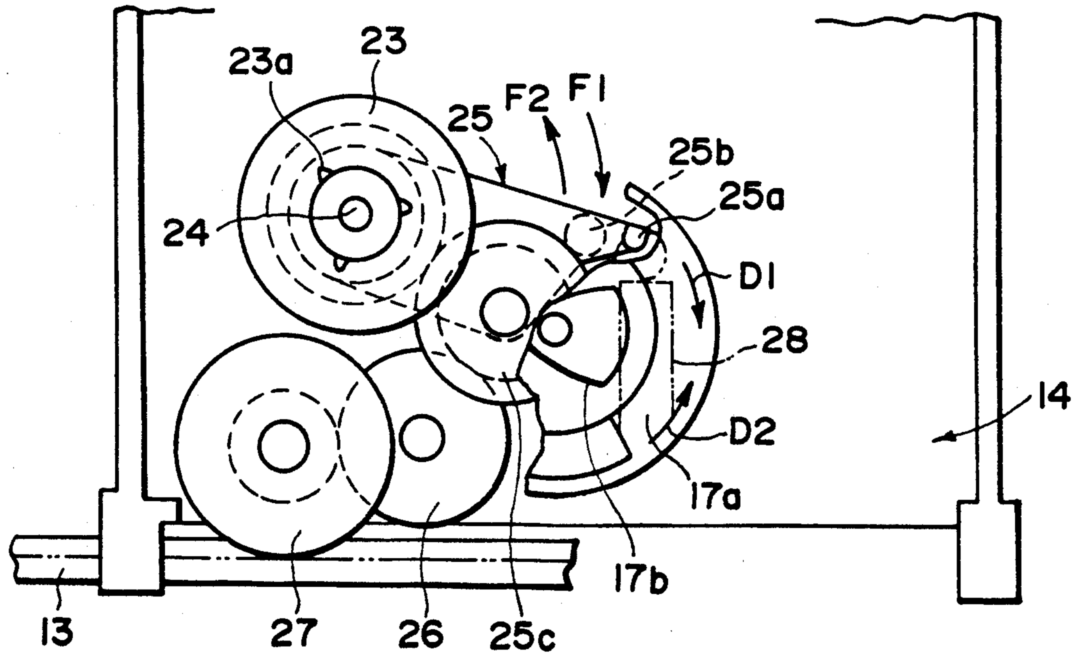
FIG. 8 is a plan view of a ribbon take-up mechanism shown in FIG. 1, illustrating the mechanism in operating condition.
Figure 9:
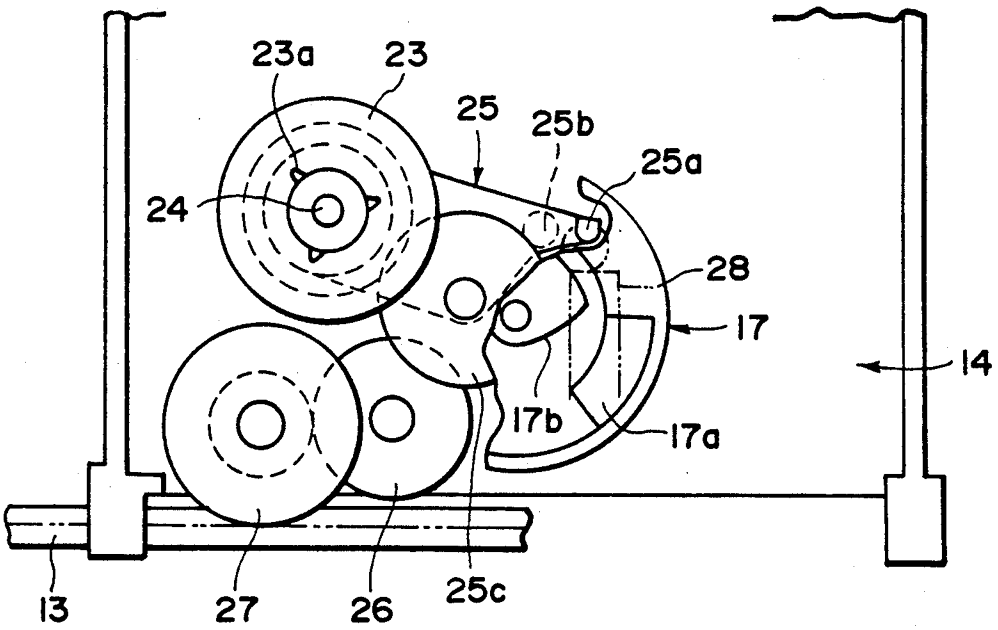
FIG. 9 is a plan view of a ribbon take-up mechanism shown in FIG. 8, illustrating the mechanism in inoperative (releasing) condition.

Referring to FIGS. 8 and 9 which are plan views of the ribbon take-up mechanism in the ribbon take-up state and ribbon take-up dismissing state, respectively, the carriage 14 carries a take-up shaft 24. A take-up lever 25 is supported by the take-up shaft 24 for rotation about the shaft 24. A take-up clutch 23 is rotatably supported by an upper portion of the lever 25. Furthermore, the take-up lever 25 rotatably supports a take-up reduction gear 25C. The reduction gear 25C engages with a gear portion (not shown) of the take-up clutch 23 in such a manner that the gear portion of the take-up clutch 23 constitutes a sun gear while the take-up reduction gear 25*c* constitutes a sun gear.

The carriage 14 also rotatably carries a take-up gear 27 and a take-up intermediate gear 26 meshing therewith. The take-up gear 27 engages with the rack 13 mentioned before.

A take-up lever pressing spring 28 is loaded between a spring retainer portion 25*a* of the take-up lever 25*a* and a spring retainer portion (not shown) of the carriage 14, so as to urge the take-up lever 25 in the direction of an arrow F1 (see FIG. 8).

The take-up clutch 23 is provided with a hub-receiving portion 23*a* which can fit in a take-up core 44 (see FIGS. 13 and 14) in the ink ribbon cassette 40.

Furthermore, a friction clutch (not shown) is provided between the hub receiving portion 23*a* of the take-up clutch 23 and the gear portion (not shown) of the same, so that the torque of the gear portion is transmitted to the hub receiving portion 23*a*.

A description will be made hereinunder as to the operation for taking up or feeding the ink ribbon or sheet.

In the ribbon take-up state as shown in FIG. 8, the ribbon cam 17 is in the state corresponding to the positions P1 to P2 or P5 to P6, so that the take-up lever 25 is urged clockwise (arrow F1) by the take-up lever pressing spring 28, thereby keeping the take-up reduction gear 25*a* on the take-up lever 25 in engagement with the take-up intermediate gear 26.

In this state, as the carriage 14 is moved in the recording direction, i.e., in the direction of an arrow B1 in FIG. 3), the take-up gear 27 is rotated due to its engagement with the rack 13.

The rotation of the take-up gear 27 is transmitted to the take-up clutch 23 through the take-up intermediate gear 26 and the take-up reduction gear 25*a* so as to rotate the hub receiving portion 23*a* of the take-up clutch 23. In consequence, the take-up core 44 in the ink ribbon cassette engaging with the hub receiving portion 23*a* is rotated to take up the ink ribbon 49.

Then, as the ribbon cam 17 is rotated clockwise or counterclockwise (directions of arrow D1 or D2 in FIG. 8), the cam surface 17*b* provided on the ribbon cam 17 and the boss 25*b* provided on one end of the ribbon cam 17 are brought into contact with each other. A further rotation of the ribbon cam 17 increases the radius of the portion of the cam surface 17*b* contacted by the boss 25*b* of the take-up lever 25, in accordance with the cam chart shown in FIG. 4.

Consequently, the take-up lever 25 is rotated counterclockwise (see arrow F2 in FIG. 8) against the force of the take-up lever pressing spring 28. When the cam surface 17*b* rotates to a position corresponding to the positions P3 to P4 in the cam chart shown in FIG. 4, the take-up gear 25C guided and supported by the take-up lever comes off the intermediate gear 26.

When the carriage 14 is further moved in the recording direction (arrow B1 in FIG. 3), the take-up gear 27 meshing with the rack 13 is rotated so as to drive the intermediate gear 26. In this case, however, sine the take-up reduction gear 25C has been disengaged from the intermediate gear 25C, the torque of the take-up gear 27 is not transmitted to the reduction gear 25C.

This means that the gear portion (not shown) of the take-up clutch 23 meshing with the take-up reduction gear is not rotated. Thus, the ribbon is not taken up in the positions P3 and P4 in FIG. 4.

A description will be made hereinunder as to the head up/down mechanism for driving the thermal head 18 (recording head) up and down.

Figure 10:
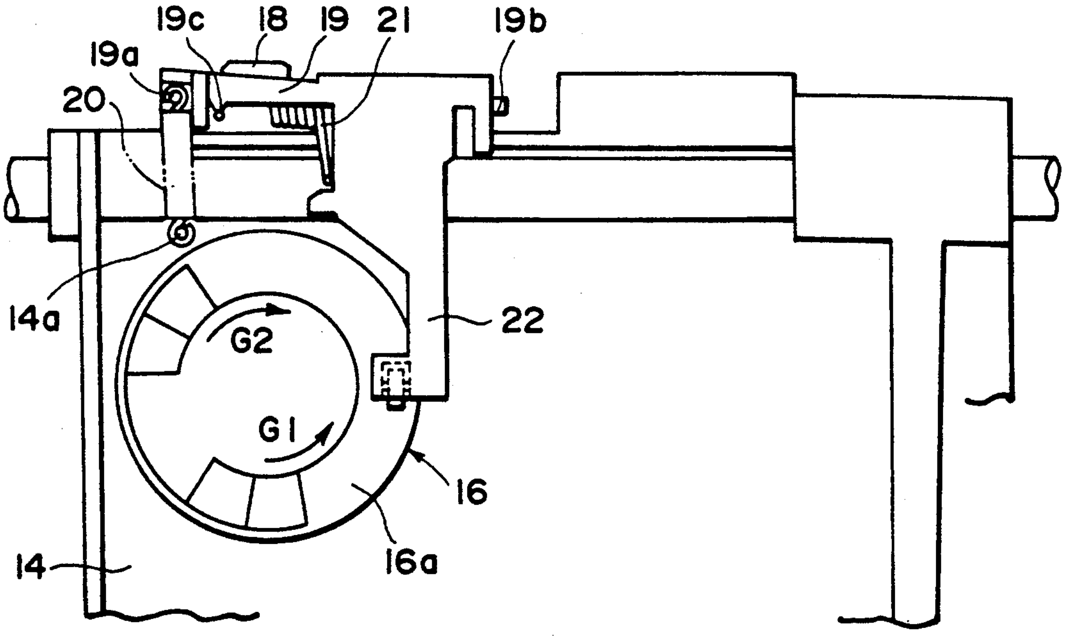
FIG. 10 is a plan view of the head up/down mechanism.
Figure 11:
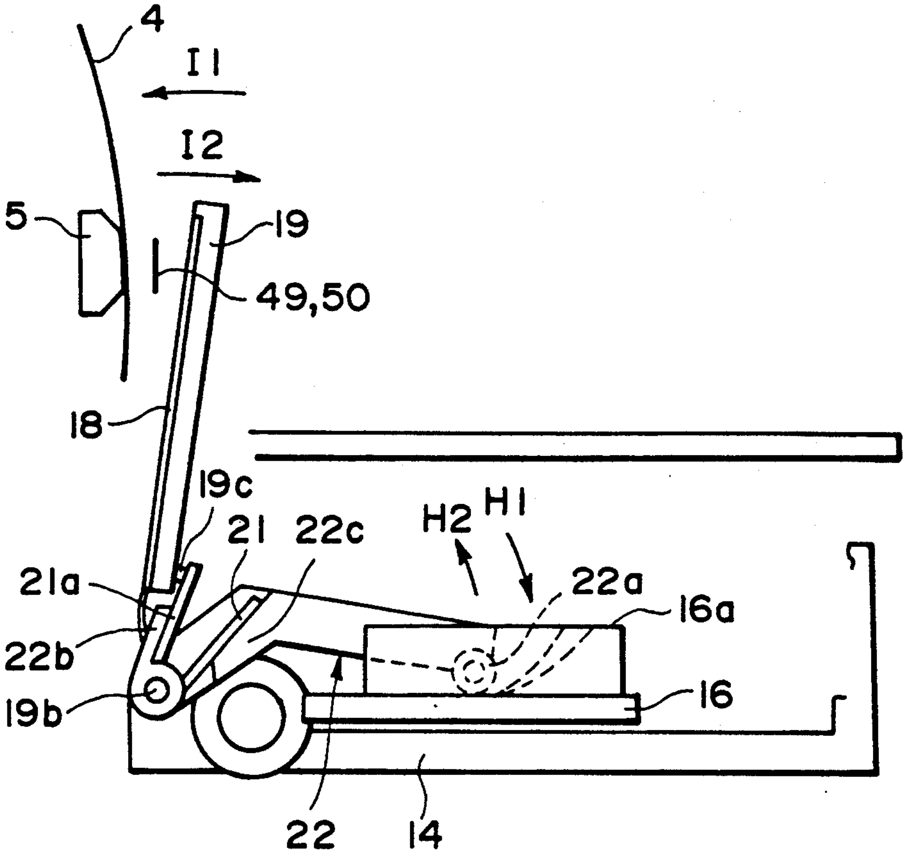
FIG. 11 is a side elevational view of the head up/-down mechanism shown in FIG. 10 in head-up condition.
Figure 12:
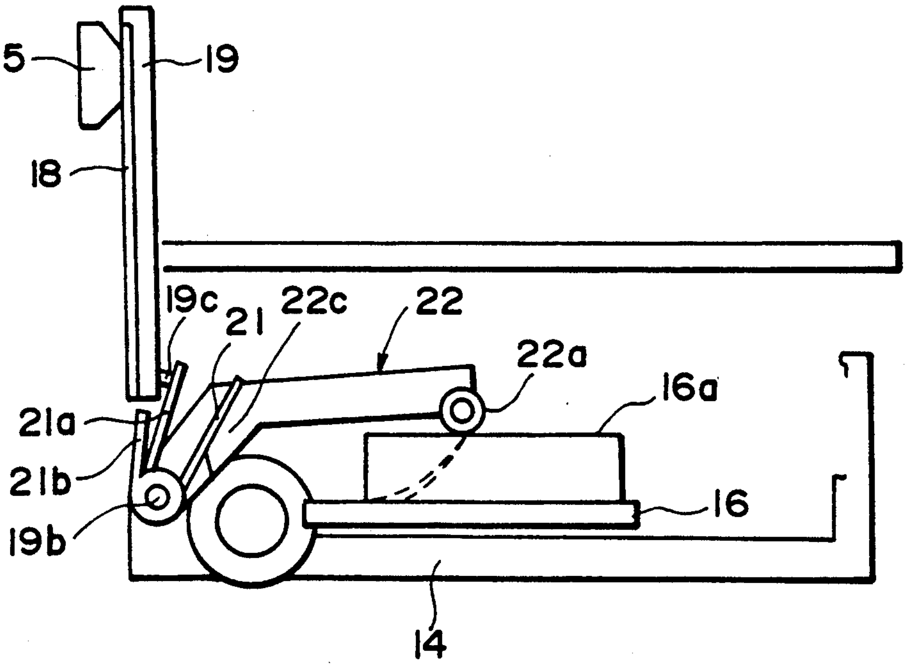
FIG. 12 is a side elevational view of the head up/-down mechanism shown in FIG. 10 in head-down condition.

FIG. 10 is a plan view of the head up/down mechanism. FIGS. 11 and 12 are side elevational views of the head up/down mechanism in the head-up and head-down states, respectively.

Referring to these Figures, a head up/down lever 22 is mounted for rotation about a head holder shaft 19*b* provided on the carriage 14. A head spring 21 is charged between projection 22*b* and 22*c* of the head up/down lever 22.

A roller 22*a* is rotatably guided and supported by one end of the head up/down lever 22. A head reset spring 20 is provided between a spring retainer portion 19*a* of the head holder 19 and a spring retainer portion 14*a* of the carriage 14, so as to urge the head holder 19 away from the platen 5, as indicated by an arrow 12 in FIG. 11.

The urging force produced by the head reset spring 20 is transmitted to an arm portion 21*a* of the head spring 21 through a pressing portion 19*c* of the head holder 19, and further to the head up/down lever 22 through the arm portion 21*a*. Thus, the head up/down lever 22 is urged away from the platen 5 by the force of the head reset spring 20 as indicated by arrow 12 in FIG. 11, whereby the roller 22*a* provided on the up/-down lever 22 is held in pressure contact with the cam surface 16*a*.

In consequence, the head 18 is swung towards the platen 5 as a result of a change in the lift of the head cam 16.

The head-down and head-up operations for pressing the recording head onto the platen 5 and for moving the same away from the platen 5 are conducted in a manner which will be explained hereinunder.

Referring to FIGS. 10 and 11, when the head cam 16 is in a state corresponding to the positions P2 through P5 in the cam chart shown in FIG. 4, the head up/down lever 22 is held in pressure contact with the head cam 16 by the force of a head reset spring 20 so that the head 18 is kept away from the recording sheet 4 and the platen 5. Thus, the recording head is held in the head-up state.

Then, as the head cam 16 is rotated clockwise as indicated by an arrow G2 in FIG. 10 or clockwise as indicated by an arrow G1 in the same Figure, the height of the position of contact between the cam 16 and the roller 22*a* on the head up/down lever 22 as viewed in the direction perpendicular to the cam surface is increased.

As a result, the head up/down lever 22 is rotated counterclockwise as indicated by an arrow H2 in FIG. 11, against the force of the head reset spring 20. The torque of the head up/down lever 22 is transmitted from the arm portion 21*a* of the head spring 21 to the pressing portion 19*c* of the head holder 19 so as to cause the head holder 19 to rotate counterclockwise (see arrow 11 in FIG. 11). In consequence, the thermal head 18 adhered to the head holder 19 is pressed onto the platen 5 through the ink sheet 4 and one of the ink ribbons 49 and 50 (see FIG. 11).

Thus, the thermal head 18 is held in contact with the recording sheet 4 during the recording and the recording sheet 4 is held as the instant position by the platen 5.

The lift of the head cam 16 continues to increase even after the thermal head 18 is brought into contact with the paten 5 through the recording sheet 4 and the ink ribbon, so that the head up/down lever 22 is further rotated counterclockwise (arrow H2 in FIG. 11).

Thus, when the rotational position of the head cam 16 corresponding to the positions P1 and P6 in the cam chart of FIG. 4 is reached, the motion of the head holder 19 is limited by the abutment of the thermal head 18 with the platen 5 through the recording sheet 4 and the ink ribbon.

Therefore, the further counterclockwise rotation (see arrow H2 in FIG. 11) of the head up/down lever 22 causes the head spring 21 to leave the projection 22*b* on the head up/down lever 22, whereby the head spring 21 is further charged up.

Since the arm portion 21*a* of the head spring 21 is designated from the projection 22*b* of the head up/-down lever 22, the force of the head spring 21 is transmitted to the pressing portion 19*c* of the head holder 19, so that the thermal head 18 is pressed onto the platen 5 through the recording sheet 4.

A description will be made hereinunder as to the synthetic operation including the head up/down operation, ribbon take-up operation and the cassette up/down operation, with reference to the cam chart shown in FIG. 4, at each of the positions P1 to P6.

Referring to FIG. 4, the position P1 is a position of the cams where the recording head is in the head-down state, the ribbon take-up mechanism is in the ribbon take-up state and the cassette is in the cassette-down position. Thus, the position P1 corresponds to a state in which the recording is conducted with the ink ribbon cassette of the upper stage of the stack. The position P2 is a position of the cams where the recording head is in the head-up state, the ribbon take-up mechanism is in the ribbon take-up state and the cassette is in the cassette-down state. Thus, the position P corresponds to a state in which the ribbon in the upper stage cassette is taken up while the recording is not conducted.

The position P3 is the position of the cams which simultaneously establishes the head-up state, ribbon take-up dismissing state and the cassette-down state, while the position P4 is the position of the cams where the head-up state, ribbon take-up dismissing state and the cassette-up state. Thus, in the position P4, the ink ribbon cassette of the lower stage of the stack is in the operative position.

The position P5 is the position of the cams which simultaneously realizes the head-up state, ribbon take-up state and the cassette-up state. Thus, in this position, the ribbon in the cassette of the lower stage of the stack is taken up while the recording is suspended.

Finally, the position P6 is the position of the cams which simultaneously achieves the head-down state, ribbon take-up state and the cassette-up state. Thus, recording is conducted with the ink ribbon in the cassette of the lower stage when the cams are in the position P6.

It is thus possible to freely and independently attain one of the six conditions, namely, the recording state, non-recording state, ribbon take-up dismissing state, ribbon take-up state, cassette-up state and the cassette-down state, by operating the head motor M3 (see FIG. 1) either clockwise or counterclockwise so as to rotate the head cam 16 and the ribbon cam 17 to one of the six positions P1 to P6.

It is not essential that the above-mentioned six conditions are controlled independently. For instance, the state of the ribbon take-up mechanism may be conducted in a certain synchronized relation to the head-up and head-down operation. It is also possible to effect three types of operations, i.e.., the head up/down operation, the switching of the states of the ribbon take-up mechanism and the cassette up/down operation independently by three motors.

Figure 13:
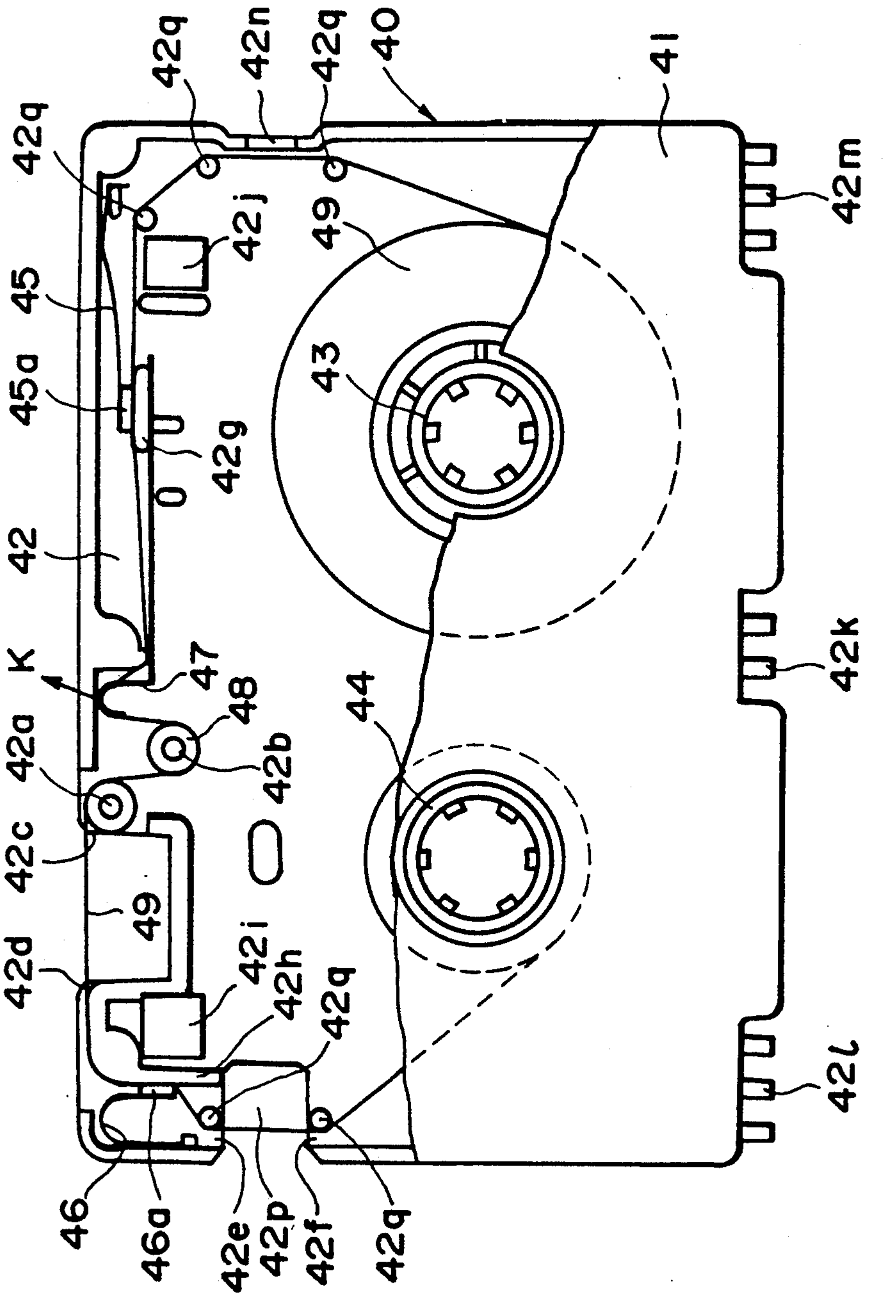
FIG. 13 is a partly-sectioned plan view of an ink ribbon cassette.
Figure 14:
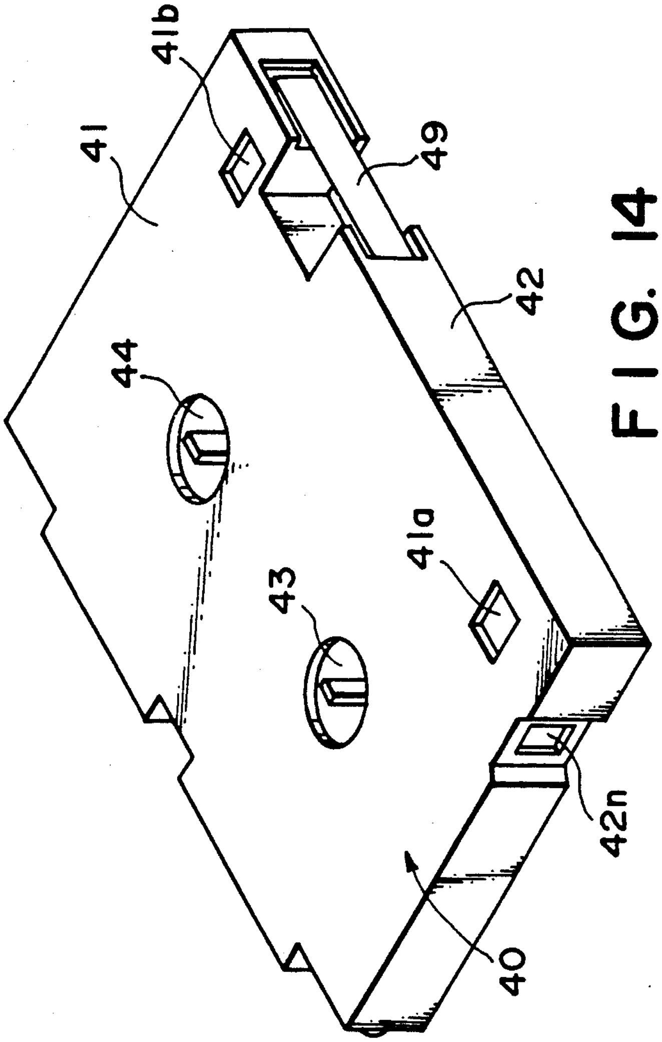
FIG. 14 is a perspective view of the ink ribbon cassette shown in FIG. 13.

A description will be made hereinunder as to the ink sheet cassette (ink ribbon cassette) with reference to FIG. 13 which is a plan view of the cassette and FIG. 14 which is a perspective view of the same.

Referring to these Figures, the ink ribbon cassette 40 has an upper case 41 and a lower case 42, and is adapted to be demountably loaded on the carriage table 35 while accommodating an ink ribbon 49 therein.

The trailing portion of the ink ribbon 49 is wound on a supply core 43. The leading portion of the ink ribbon 49 is led past a guide pin 42*q* and rollers 48 rotatably mounted on projections 42*a*, 42*b* of the lower case 42, so as to be exposed through an opening 42*c* formed in the lower case 42. The ink ribbon 49 is then led again into the cassette 40 through an opening 42*d* in the lower cassette 42 and is exposed again through an opening 42*e* formed in the lower case 42. The ink ribbon is then led into the cassette 40 through an opening 42*f* in the lower case so as to be taken-up by the take-up core 44 past a guide pin 42*q*.

When the cassette 40 is loaded correctly on the carriage table 35, the exposed portion of the ink ribbon 49 between the openings 42*c* and 42*d* is positioned such as to face the recording head 18 on the carriage 14 so that this portion of the ink ribbon 49 is selectively heated by the thermal head 18 which generates heat in accordance with recording information. The ink ribbon 49 is urged onto projections 42*g*, 43*h* of the lower case 42 by means of pressing springs 45, 46 which are provided on the lower case 42. Pieces of felt 45*a*, 46*a* are adhered to the pressing springs 45, 46 so as to prevent any damage on the ink ribbon 49 which may otherwise be caused due to contact with the pressing springs 45, 46.

A tension spring 47 serves to urge the ink ribbon 49 in the direction of an arrow K (see FIG. 13) so as to cooperate with the pressing springs 45, 46 in eliminating any slack of the ink ribbon 49.

A portion of the ink ribbon 49 is exposed through an opening 42*n* in the lower case 42. When the cassette 40 is loaded in the right position on the carriage table 35, the opening 42*n* in the lower case 42 is positioned to face a ribbon sensor S2 which is provided on the main part and capable of sensing "ribbon end", i.e., the terminal end of the ink ribbon. At the same time, the exposed portion of the ink ribbon 49 between the openings 42*e* and 42*f* is opposed by a color sensor S3 which is provided on the main part and which is received in a notch 42*p*.

As will be understood from the foregoing description, the ink ribbon cassette 40 which is demountably loaded on the recording apparatus having the recording head 18 has a recessed portion facing a path of feed of the ink ribbon 49 which is fed from a supply end 43 to a take-up end 44 and capable of receiving the recording head 18, a pair of friction means 45,46 disposed on both sides of the recessed portion and adapted for frictioning the ink ribbon 49, and urging means provided in the portion of the path of feed of the ink ribbon 49 between the pair of friction means 45, 46 and adapted for imparting a tension to the ink ribbon 49, whereby the ink ribbon can be fed at a constant moderate level of tension without exhibiting any slack. It is therefore possible to obtain a high quality of recorded image, while eliminating any damage of the ink ribbon.

It also will be understood that the invention provides a multi-cassette type recording apparatus capable of performing multi-color printing, wherein one of an ink ribbon cassette loaded with an ink ribbon of the desired color is selected out of a plurality of stacked ink ribbon cassettes 40, 40 having ink ribbons of different colors, and the selected ink ribbon cassette is brought to a recording position where the recording is conducted by a recording head 18 onto a recording medium 4 with the ink ribbon carried by the selected cassette, the apparatus comprising: supporting means 35 capable of supporting the stack of the ink ribbon cassettes 40 and moving the stack in the stacking direction, and driving means 17 for causing the supporting means 35 to move in the stacking direction thereby bringing the ink ribbon 49 of the selected ink ribbon cassette 40 to the recording position. A moderate tension of a constant level in the ink ribbon 49 is ensured also in this apparatus, so that a high quality of the recorded image is assured.

The ink ribbon cassette of the described embodiment has a recessed portion facing the path of feed of the ink ribbon 49 which is fed from the supply end 43 to the take-up end 44 and capable of receiving the recording head 18, and a tensioning means 46 which includes a spring member 46 disposed at an intermediate portion of the path of feed of the ink ribbon 49, the spring member 46 being cantilevered and provided at its free end with a frictioning portion 46*a*, the spring member 46 being bent at its intermediate portion such that the free end and the supported end of thereof oppose each other, whereby the frictioning portion 46*a* imparts a comparatively small tension to the ink ribbon 49 moving from the supply end 43 to the take-up end 44, while imparting a comparatively large tension to the ink ribbon 49 moving from the take-up end 44 to the supply end 43, thus facilitating the movement of the ink ribbon 49 in the feeding direction while resisting backward movement of the ink ribbon 49. This arrangement remarkably suppresses any tendency for the ribbon to be slackened.

The spring member 46 has a U-shaped or a V-shaped form so that it can be placed in a compact manner even in a restricted space.

The spring member 46 is disposed downstream of the recessed portion (portion for receiving the head 18) in the path of feed of the ink ribbon as viewed in the direction of feed of the ribbon, i.e., on the side of the recessed portion closer to the ribbon take-up end 44. The frictioning portion is constituted by a felt member 46*a* which acts to press the ink ribbon 49 onto the wall surface (projection) 42*h*. A guide portion is provided for guiding the ink ribbon 49 into closer contact with the felt member 46*a* during feeding of the ink ribbon 49 from the supply end 49 to the take-up end 44.

The ink ribbon cassette 40 is adapted to be detachably loaded in a recording position where it can cooperate with the recording head 18 in recording information on the recording medium backed-up by the platen 5. The ink ribbon cassette 40 has a substantially box-type structure composed of an upper case 41 and a lower case 32 which are connected to each other at their vertical walls so as to provide a first side wall facing the platen 5 and a second side wall opposing the first side wall, the first side wall having at its one end a recessed portion capable of receiving the recording head 18 while the second side wall has engaging portions 42*h*, 42*l* and 42*m* engageable with retaining members 35*c*, 35*d* and 35*e* on the recording apparatus. The upper and lower cases are provided at their portions adjacent to the first and the second side walls with apertures 41*a*, 41*b*, 42*i*, 42*j* which in combination constitute a pair of through holes which receive locating members 35*a*, 35*b* on the recording apparatus thereby enabling the ink ribbon cassette to be accurately located. The arrangement is such that the path of feed of the ink ribbon 49 extends along the first side wall of the ink ribbon cassette in such a manner as to avert from the pair of through holes. This arrangement makes it possible to position the path of feed of the ink ribbon 49 in the region near the first side wall of the ink ribbon 49, thus contributing to a reduction in the size of the ink ribbon cassette 40 itself and the recording apparatus.

The ink ribbon cassette 40 is loaded on the recording apparatus by making use of the engaging portions 42*k*, 42*l* and 42*m*, as well as the through holes 41*a*, 41*b*, 42*i* and 42*j*. This makes it possible to realize an arrangement in which a plurality of ink ribbon cassettes 40 of the same size and design and accommodating ink ribbons of different colors are stacked in a plurality of stages.

Thus, in the recording apparatus of the present invention, a plurality of ink ribbon cassettes accommodating the respective ink ribbon 40 are stacked in stages, and the ink ribbon cassette having the desired ink ribbon is brought to the recording position such that recording is effected on the recording medium 4 on the platen 5 by means of the recording head 18 with the desired ink ribbon. The recording apparatus comprises a base member 35 which carries a stack of a plurality of ink ribbon cassettes 40, a pair of locating members 35*a*, 35*b* adapted to be received in a pair of through holes 41*a*, 41*b*, 42*i*, 42*j* formed in the stack of the ink ribbon cassettes, and retaining members 35*c*, 35*d* and 35*e* projecting from the base member 35 and provided at their ends with claws capable of engaging with engaging portions 42*k*, 42*l* and 42*m*, whereby the plurality of ink ribbon cassettes of the stack are located by the common locating members 35*a* and 35*b*. It is thus possible to simultaneously attain both a reduction in the size of the ink ribbon cassette 40 and the common use of the ink ribbon cassette of the same size and shape in the stack of a plurality of ink ribbon cassettes.

A description will be made hereinunder as to a multi-color ribbon (multi-color ink sheet) with specific reference to FIG. 15.

Figure 15:
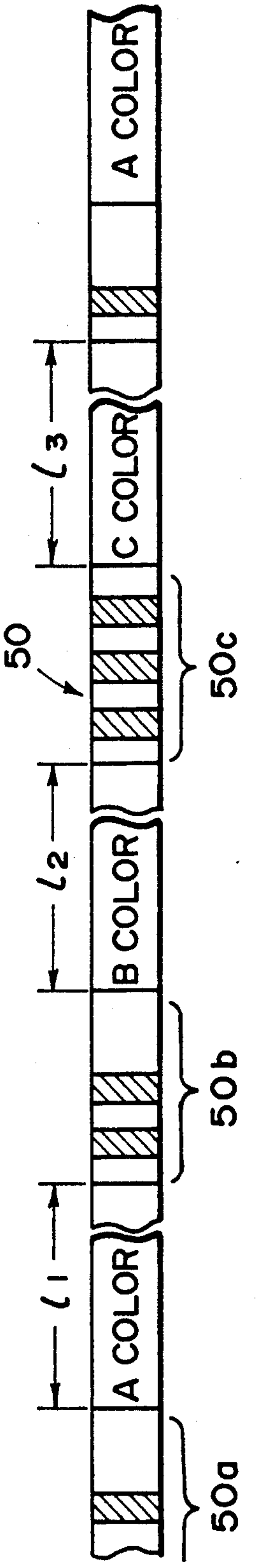
FIG. 15 is an illustration of the construction of a multi-ink ribbon.

FIG. 15 shows an example of the multi-color ribbon 50 on which are provided successive regions of different colors, which are assumed to be color A, color B and color C, with bar codes 50*a*, 50*b* and 50*c* between adjacent regions. The multi-color ribbon 50 also is stored in the ink ribbon cassette 40 as is the case of the ink ribbon 49.

When the ribbon cassette 40 is placed in the right position on the carriage table 35, the color sensor S3 (see FIG. 3) of the main part opposes the exposed portion of the multi-color ribbon 50 between the apertures 42*e* and 42*f* of the lower cause 42.

When the multi-color ribbon is taken up onto the take-up core 44, the bar codes 50*a*, 50*b* and 50*c* are sensed by the color sensor S3 whereby the color which follows the sensed bar code is detected. As will be seen from FIG. 15, the bar codes may be constituted by different number of black stripes or black stripes of different width. Thus, any suitable type of bar codes can be used. The number of colors also may be varied though a tri-color ink ribbon is specifically mentioned.

Figure 16:
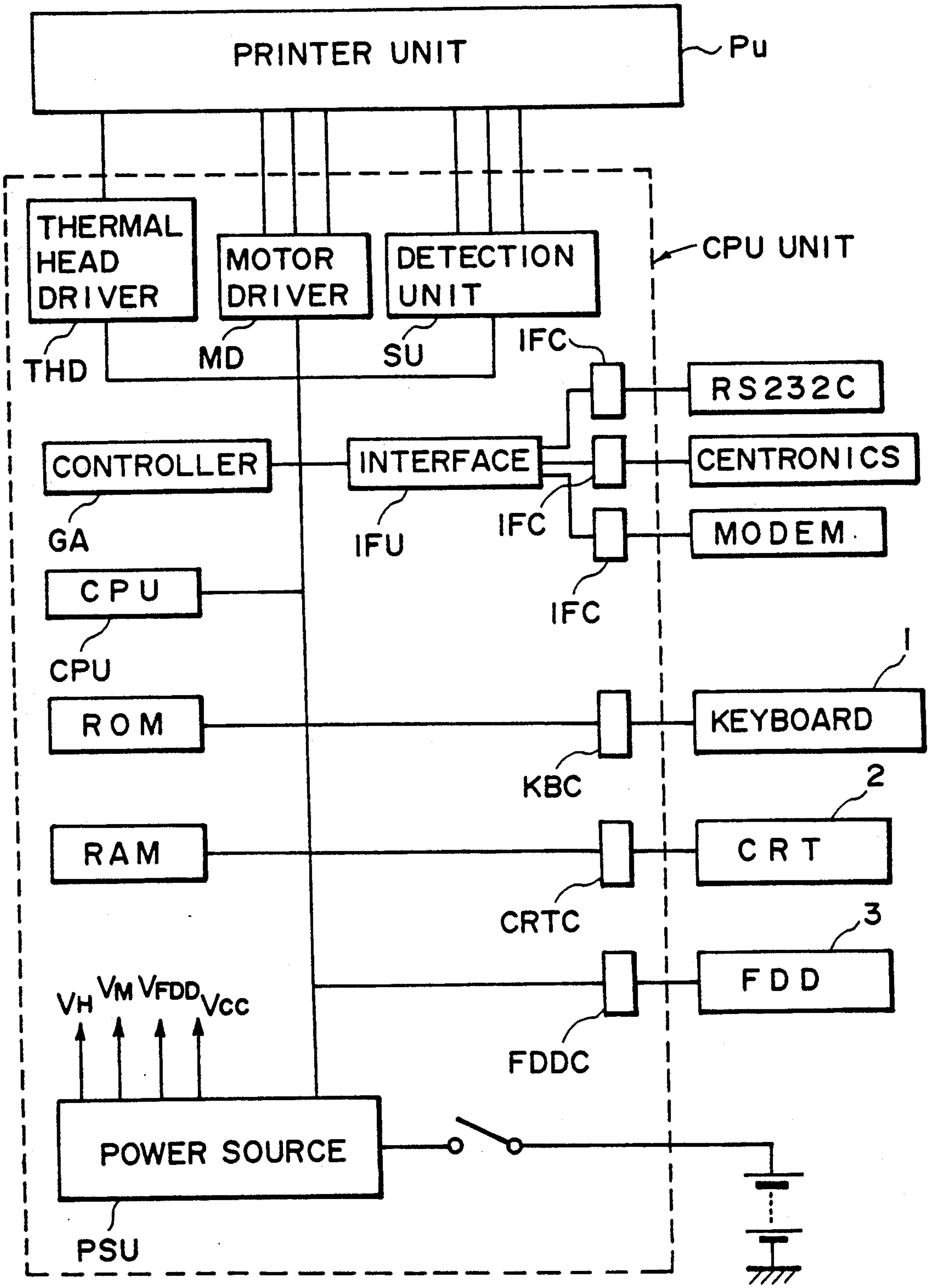
FIG. 16 is a block diagram of a control system for controlling the operation of the recording apparatus of the present invention.

FIG. 16 is a block diagram of the recording apparatus described above. This block diagram shows only the connections between related blocks, while minute control lines are omitted.

The apparatus has a central processing unit CPU which reads various data from later-mentioned read-only memory ROM and floppy disk drive FDD and performs various computations and judgments, as well as various types of control. The CPU may be by a plurality of units.

The read-only memory ROM stores various data such as various programs for the CPU operation, dot patterns (character generator CG), and data necessary for printing.

A read/write memory RAM has a working area for temporarily storing data appointed by the CPU and result of computation performed by the CPU, a buffer area for storing various data input through the keyboard 1, external interface IFU, floppy disk drive FDD 3 and so forth, and a text area for storing a document.

The CPU unit is connected to the printer unit Pu through a thermal head driver THD, motor driver MD and a sensor unit SU.

The thermal head driver THD is adapted for driving the thermal head 18 on the printer unit Pu under the control of the CPU, while the motor driver MU drives the sheet feed motor M1, carriage motor M2 and the head motor M3, under the control of the CPU.

The detection unit SU is adapted to transmit various signals from the home position sensor S1, ribbon sensor S2 and the color sensor S3 which are on the printer unit Pu to the CPU.

The power supply PSu supplies driving power VH for driving the thermal head 25, recording sheet feed motor M1, driving power VM for driving the carriage motor M2 and the head motor M3, driving power VFDD for driving the floppy-disk drive FDD3 and power Vcc for various logic circuits.

The controller GA conducts various controls under the control of the CPU, such as control of the printing data transfer to the thermal head 18, control of variation of the voltage and current of the driving power VH, variation of the heat time and duty, and so forth.

A keyboard 1 for inputting various data necessary for the printing and edition is connected to the CPU unit through the keyboard connector KBC.

A CRT 2 for displaying various data input through the keyboard 1 is connected to the CPU through a CRT connector CRTC. The CRT 2 may be substituted by other types of display device such as a liquid crystal display.

Furthermore, a floppy-disk drive FDD 3 is connected to the CPU unit through an FDD connector FDDC. It is possible to use a hard disk, an external RAM or an external RAM in place of the FDD 3.

It is possible to connect an interface through an interface connector IFC for the purpose of control of this apparatus by an external controller or for the purpose of communication with an external device. Examples of such an interface are an RS232C, Centronics interface and a MODEM.

Although not shown in FIG. 16, the recording apparatus may be provided with an acoustic output device such as a buzzer.

Figure 17:
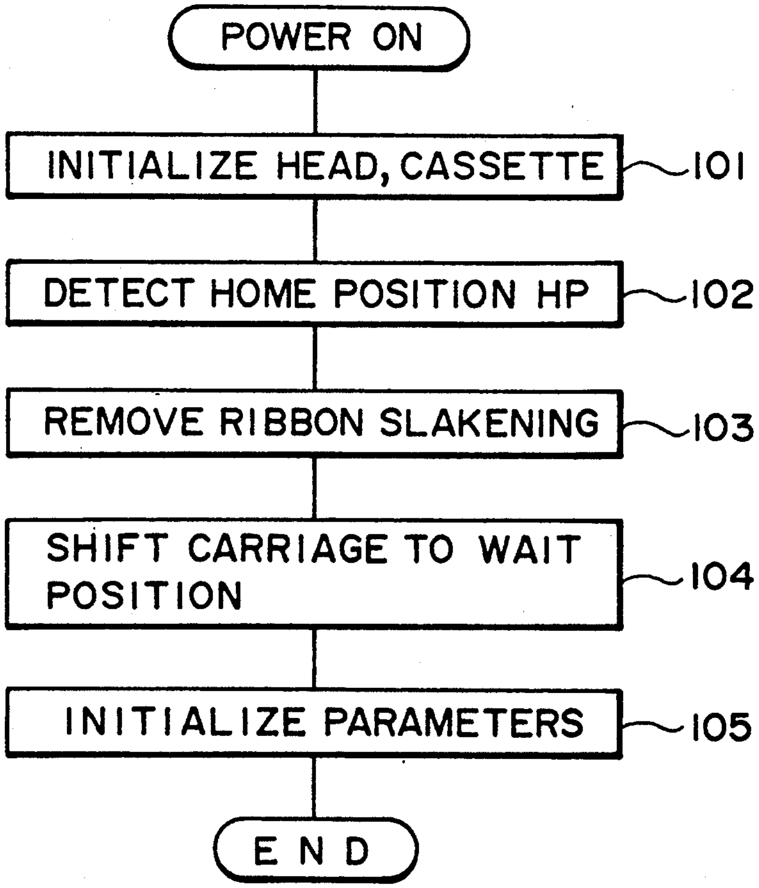
FIG. 17 is a flow chart illustrating the power-on process in the operation of the recording apparatus shown in FIG. 16.

FIG. 17 is a .flow chart illustrating the control operation for controlling the power-on process of the recording apparatus embodying the present invention. A description will be made hereinunder as to the manner in which the recording apparatus is controlled in accordance with programs stored in the ROM or FDD, with specific reference to FIG. 17.

As will be understood from the foregoing description, the recording apparatus can be loaded with at least with two ink ribbon cassettes. Thus, monochromatic printing and multi-color printing can be performed by using an ink ribbon cassette having a monochromatic ink ribbon and an ink ribbon cassette having a multicolor printing.

Referring to FIG. 17, as the power supply of the apparatus is turned on, an operation is conducted in Step 101 for initializing the head and the cassette. This is effected by raising the thermal head 18 (head-up) while shifting the carriage table 35 down (cassette-down operation) so as to set the ink ribbon cassette of the upper stage in the printing position. The detail of initialization of the head and cassette will be described later.

In Step 102, the carriage motor M2 is driven to shift the carriage 14 towards the home position sensor S1 (see FIG. 1) and is stopped when the carriage 14 is sensed by the home position sensor S1, thus determining the absolute position of the carriage 14.

Subsequently, in Step 103, any slack of the ribbon is taken up so as to avoid any interference between the ribbon and a recording sheet 4 during setting of the recording sheet 4. The detail of the operation for taking up the slack will be explained later.

Subsequently, in Step 104, the carriage 14 is shifted to a stand-by position.

Finally, initialization of various parameters is conducted in Step 105. Namely, the multi-color ribbon set color (MRS) is set as (not decided), while the multicolor ribbon remaining amount (MRL) is set at "0" (zero). The multi-color ribbon set color (MRS) and the multi-color ribbon remaining amount (MRL) will be described later.

Figure 18:
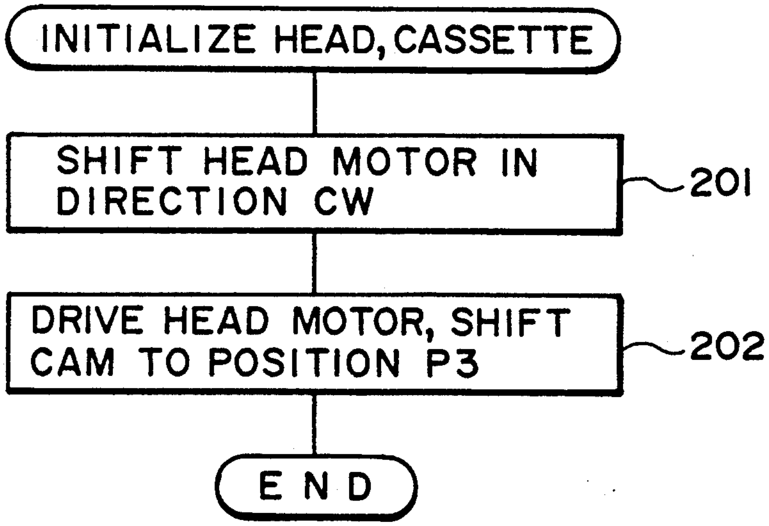
FIG. 18 is a flow chart illustrating the process for initializing the positions of the thermal head and the cassette in FIG. 17.

FIG. 18 is a flow chart showing the process for initializing the cassette position. Referring to this Figure, the head motor M3 is driven in the direction of an arrow J1 (see FIG. 1) so as to rotate the head cam 16 (see FIG. 1) and the ribbon cam 17 (see FIG. 1) until they are stopped by the stopper.

The rotational position of the cams at the moment when the power supply is turned on is indefinite. It is, however, possible to initialize the positions of the head cam 16 and the ribbon cam 17 by allowing these cams to be stopped by the stopper in the direction CW. by driving the head motor M3 through an angle which is greater than the full range of rotation of the cam.

Then, in Step 202, the head motor M3 is driven by a predetermined amount in the direction of the arrow J2 (see FIG. 1), thus setting the head cam 16 and the ribbon cam 17 at the cam position P3 in the cam chart shown in FIG. 4.

Therefore, as stated before, the thermal head 18 is lifted away from the platen 5 (head-up operation) while the function for taking up the ribbon is dismissed. On the other hand, the carriage table 35 is shifted down (cassette-down operation), thereby to set the cassette of the upper stage at the recording position.

Figure 19:
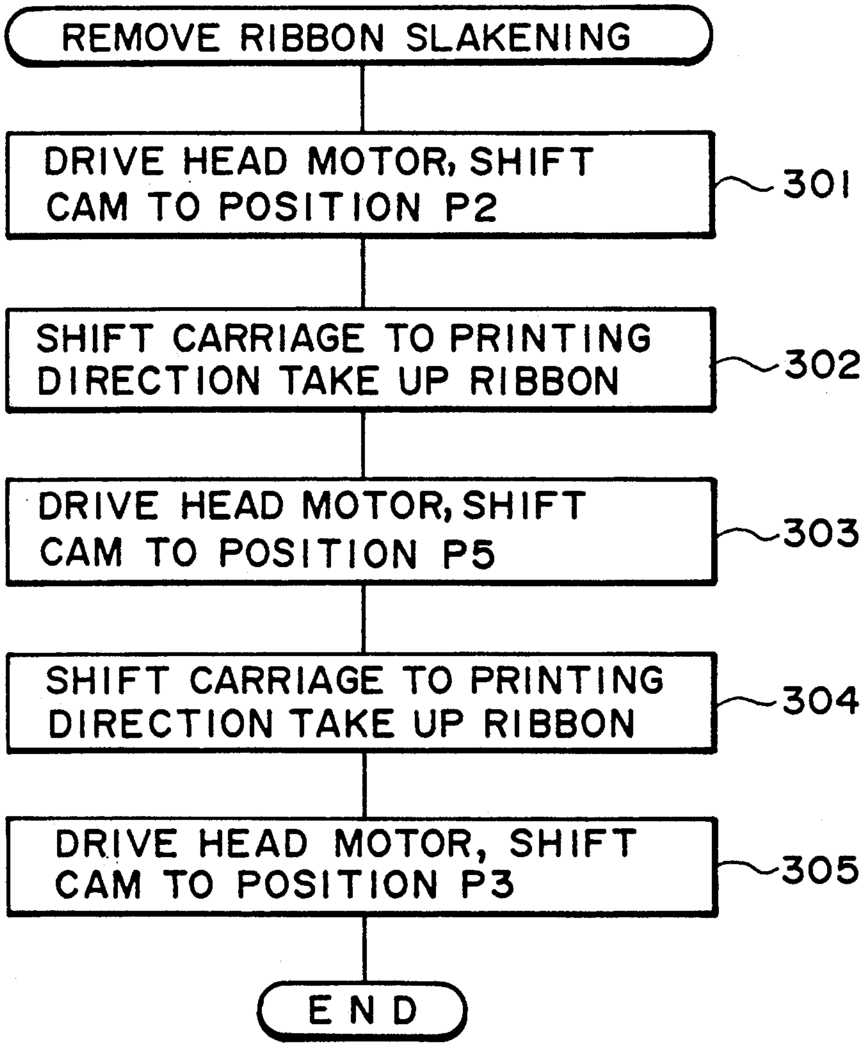
FIG. 19 is a flow chart illustrating a process for taking up slack of the ink ribbon.

FIG. 19 is a flow chart illustrating the process for taking up any slack of the ribbon.

Referring to this Figure, in Step 301, the head motor M3 is started to rotate the head cam 16 and the ribbon cam 17 to the position P2 shown in the cam chart in FIG. 4. Subsequently, in Step 302, the carriage motor M2 is driven to shift the carriage 14 in the printing direction.

As explained before, the shifting of the carriage 14 in the printing direction while the cams are in the position P2 causes the take-up clutch 23 to rotate, whereby the ink ribbon in the cassette of the upper stage is taken up.

Subsequently, in Step 303, the head motor M3 is driven to bring the head cam 16 and the ribbon cam 17 to the position P5 shown in the cam chart in FIG. 4. As a result, the cassette of the lower stage is shifted to a position where the printing is conducted with the ink ribbon in this cassette, while the take-up core in the cassette of the lower stage is brought into engagement with the take-up clutch 23.

Subsequently, in Step 304, the carriage motor M2 operates to shift the carriage 14 in the printing direction. As explained before, the shifting of the carriage 14 in the printing direction while the cams are in the position P5 causes the take-up clutch 23 to rotate, whereby the ink ribbon in the cassette of the lower stage is taken up to eliminate the slack.

In Step 305, the head motor M3 is driven so as to rotate the head cam 16 and the ribbon cam 17 to the cam position P3 shown in FIG. 4, thus completing the process.

The described sequence of the operation for taking up slack of the ink ribbon is only illustrative, and the take-up of the slack also can be conducted by executing Steps 303, 304, 301, 302 and 305 in the mentioned order. The amount of shift of the carriage 14 for taking up slack of the ink ribbon must be minimized because a large amount of shift of the carriage causes the ink ribbon to be taken up excessively, resulting in a wasteful consumption of the ink ribbon.

Figure 20:
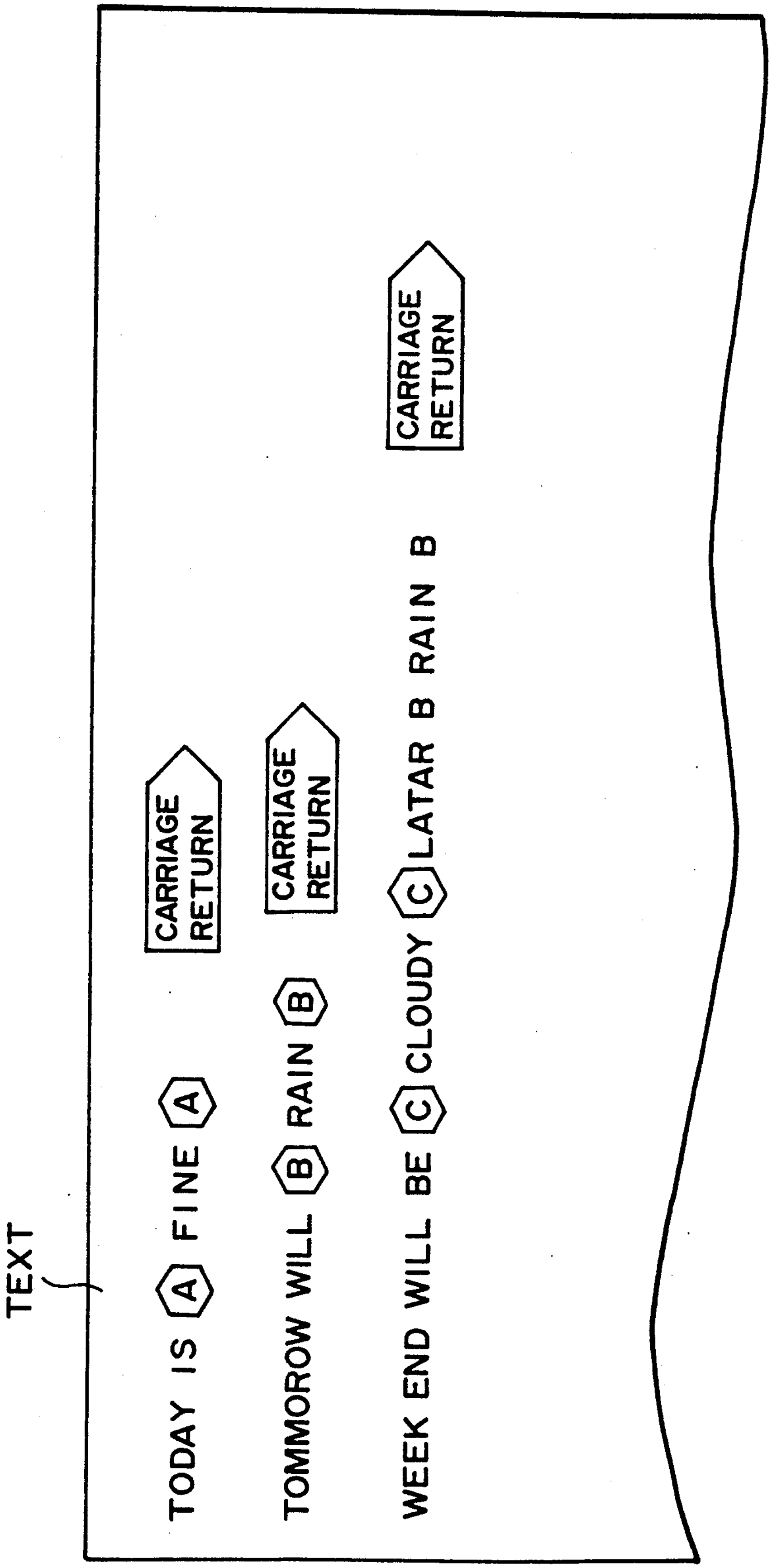
FIG. 20 is an illustration of an example of a process for appointing one of the colors in a text.

FIG. 20 illustrates an example of a process for designating a color in which a specific portion of a text is to be printed. The designation is made by demarcating the region to be printed in this color, and inputting an instruction for designating the desired color by a color designating key. The keyboard 1 can have a plurality of color designating keys corresponding to different colors, or the designation of color may be effected by a suitable combination of keys such as a combination of single color key and one of a plurality of numeral keys corresponding to different colors, or a combination of a function key and one of alphabetic keys, e.g., c, corresponding to different colors.

The demarcation of the region in the text may be conducted by placing a specific character at the beginning and tail ends of the region as shown in FIG. 20, or the characters in the region may be displayed in a bold form. When a color display device such as a color CRT or a color LCD is used as the display device, the demarcation of the region of the text to be printed in a specific color is most conveniently and efficiently displayed by the same color as the printing color, so that this region can easily be recognized.

When a monochromatic CRT or a monochromatic LCD is used as the display device, it is rather difficult to discriminate the demarcated region. In such a case, therefore, it is advisable to adopt such a function that the demarcated region can be intensified or made to blink in accordance with a key operation, thus facilitating the recognition of the demarcated region.

Figure 21A:
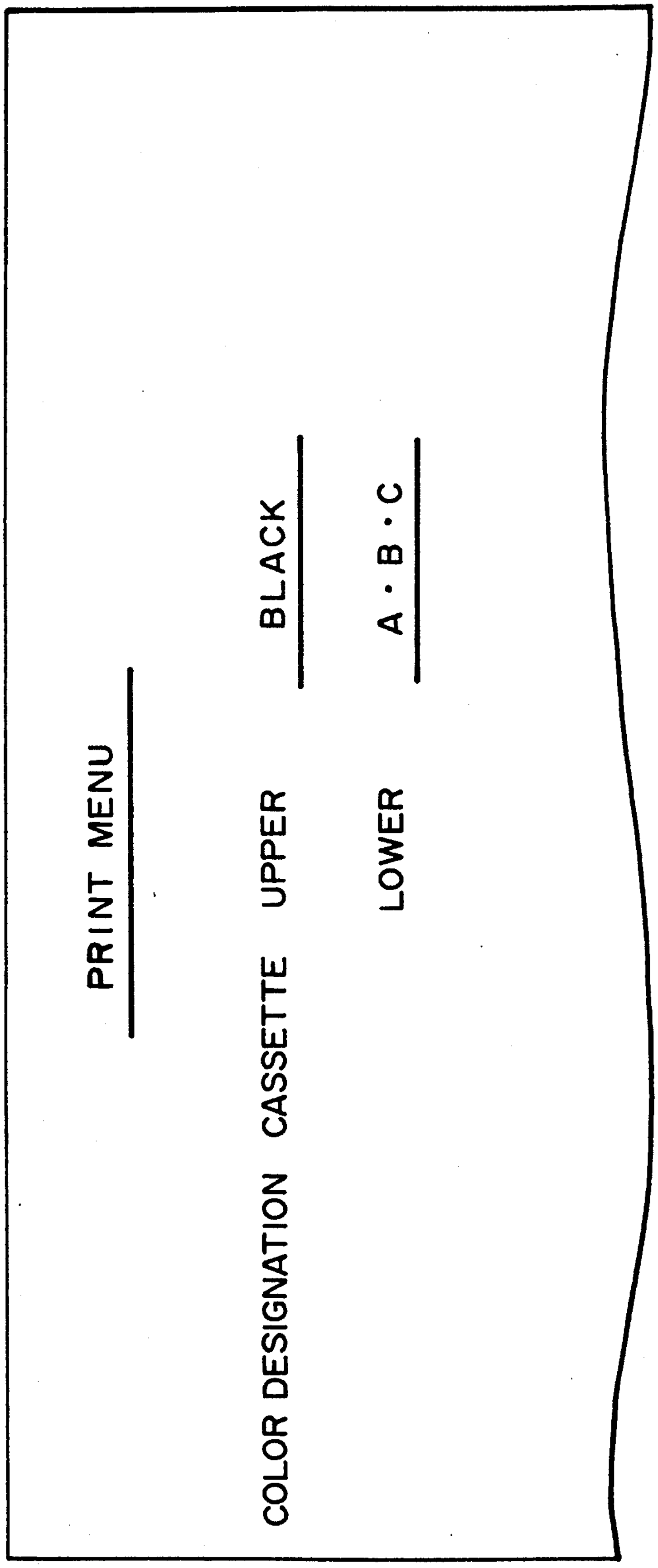
FIGS. 21(*a*) and 21(*b*) are illustrations of an example of a process for appointing a color in the printing menu.

A description will be made hereinunder as to a printing menu for setting various parameters in the printing, with specific reference to FIG. 21 which illustrates an example of the operation for appointing a color with such a printing menu.

Figure 21B:
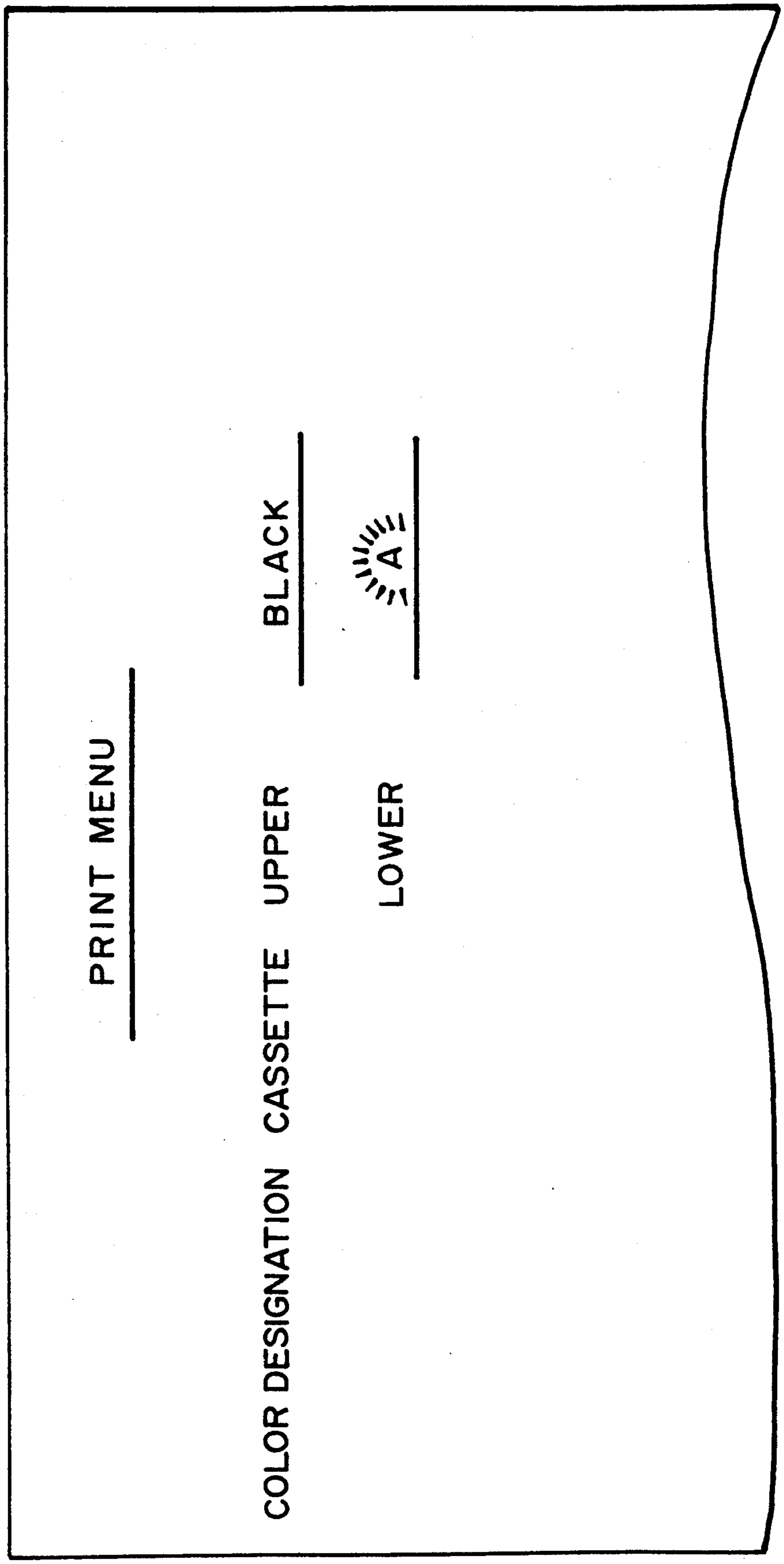

The color of the cassette is designated as shown in FIG. 21(*a*) in accordance with the color designation in the text as shown in FIG. 20. When the color designation actually conducted does not conform with the color designation in the text, e.g., as shown in 21(*b*), the operator can be warned by a blink of the portion which does not conform with the color designation in the text, or by means of a buzzer.

When the operator dares to execute the printing neglecting the warning, the printing is effected in accordance with the color designation set in the menu, rather than the color designation in the text.

It is therefore possible to easily alter the color designation simply by setting the desired color designation in the printing menu, without requiring alteration of the color designation in the text. For instance, it is possible to effect a monochromatic (black or red) printing of a text which has been demarcated for multi-color printing, or to print in blue color the portion of the text which has been designated for printing in red.

Although a color designation on the displayed printing menu has been specifically described, the input means for effecting color designation may be effected on any area on the display other than the text or, alternatively, may be effected by input means other than that on the display, e.g., a specific key on the keyboard, a specific switch or a series of key operation. Thus, the printing in desired color is possible by effecting the color designation of the cassette at the portion other than the text.

Figure 22A:
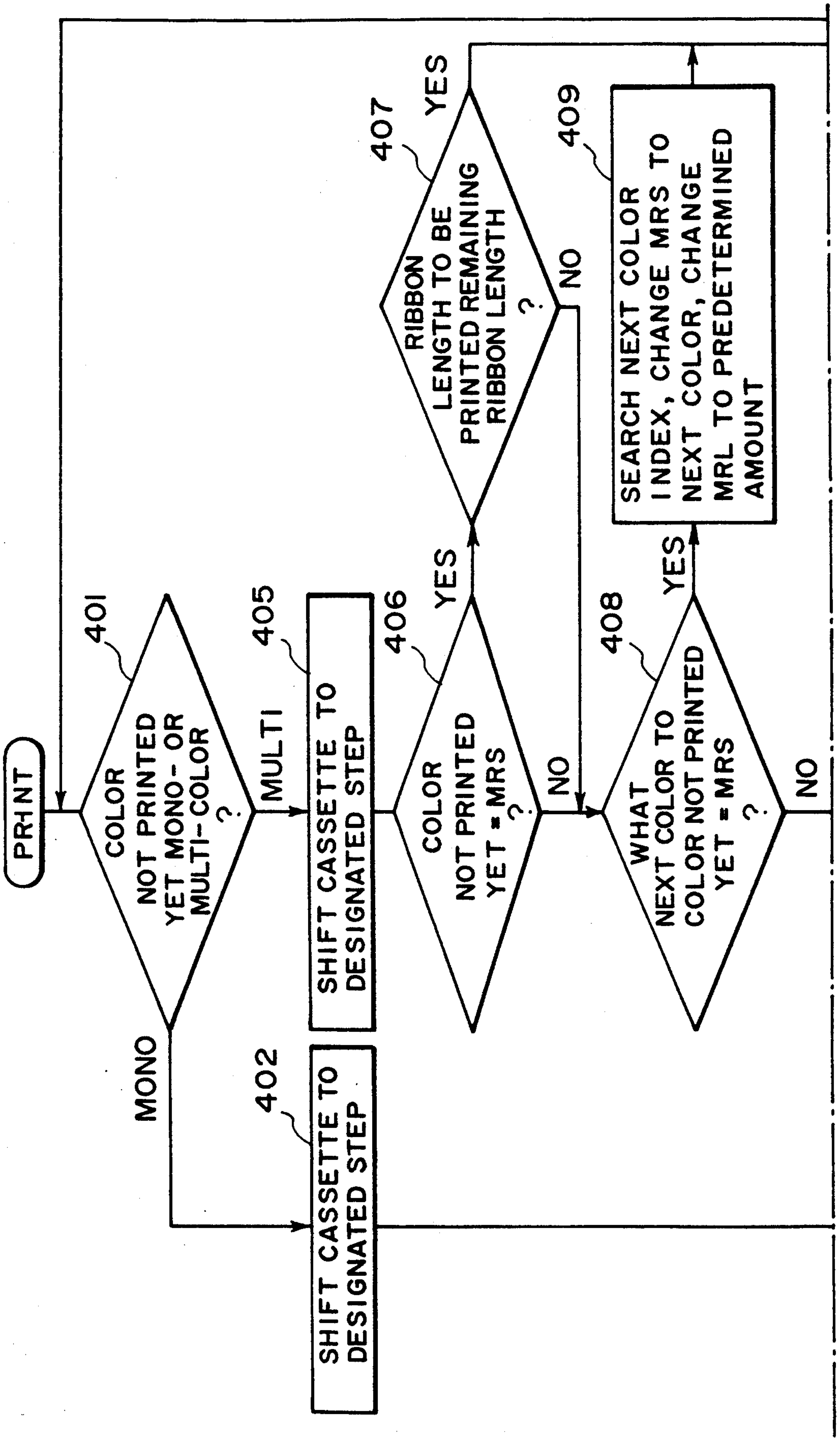
FIGS. 22, consisting of FIGS. 22A and 22B, is a flowchart of a recording sequence performed by the recording apparatus of the present invention.
Figures 22, 22B:
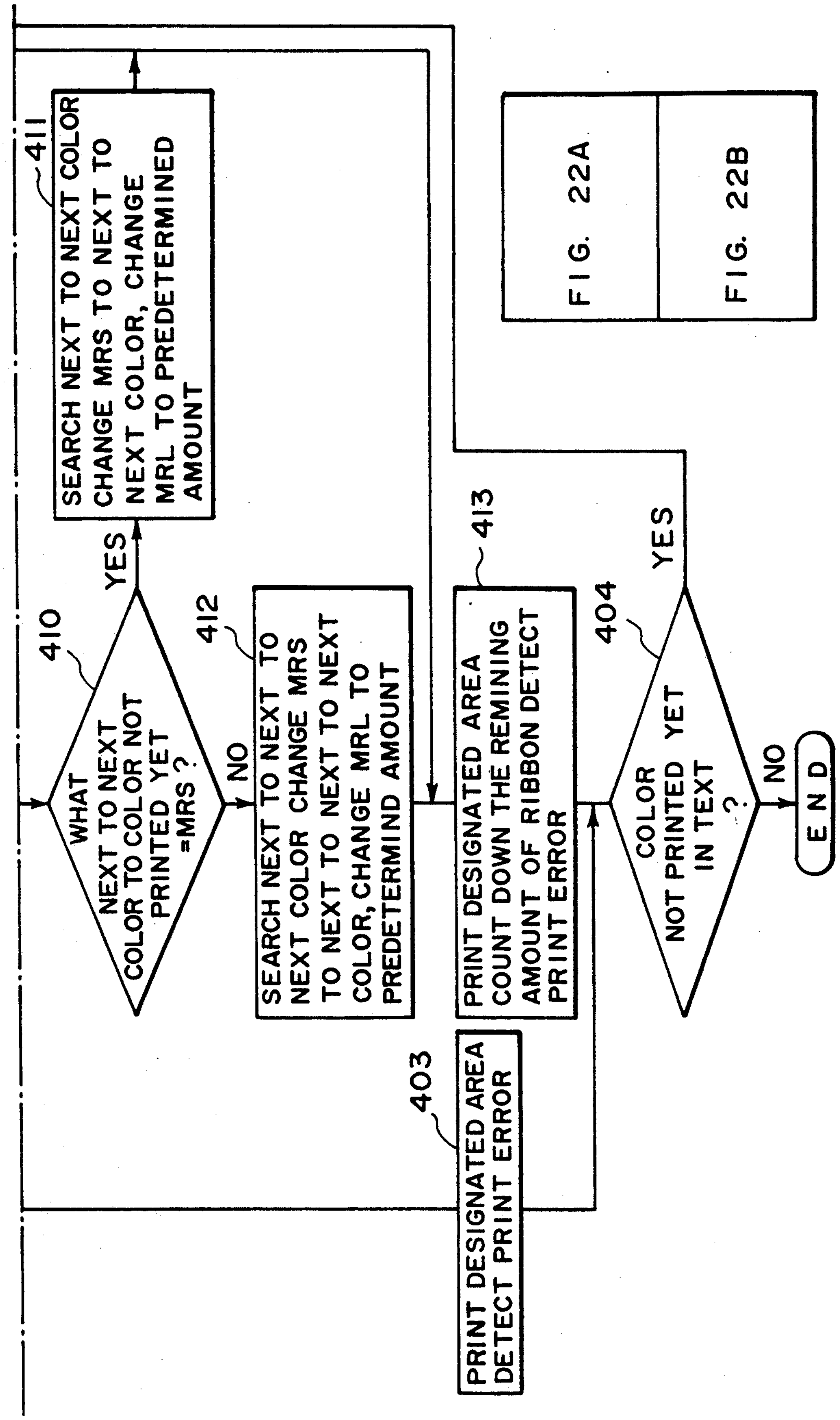

FIG. 22 is a flow chart showing the printing sequence. A description will be made hereinunder with specific reference to FIG. 22 as to the operation for executing printing of the text formed as shown in FIG. 20, in accordance with the color designation in the printing menu as shown, for example, in FIG. 21A.

Referring to FIG. 22, in Step 401, a judgment is conducted as to whether the color which has been designated in the printing menu and which has not been printed yet is a monochromatic color or a multi-color. When this color is a monochromatic color, or when this color includes both monochromatic and multi-color, the process proceeds to Step 402, whereas, when the color is multi-color, the process proceeds to Step 405.

In Step 402, the cassettes are shifted to bring the cassette of the designated color to the printing position. Namely, when the printing is to be done with the ink ribbon in the ink ribbon cassette of the upper stage, the head motor M3 operates to shift the cams to the position P3 shown in FIG. 4, whereas, when the printing is to be made with the ink ribbon in the cassette of the lower stage, the cams are shifted to the position P4 shown in FIG. 4. The process then proceeds to Step 403 in which the carriage motor M2 is started so as to move the carriage 14 to the designated printing position, and the head motor M3 is driven to shift the head cam 16 and the ribbon cam 17 to the printing position. More specifically, the head cam 16 and the ribbon cam 17 are shifted to the cam position P1 in FIG. 4 when the printing is to be done with the ink ribbon in the ink ribbon cassette of the upper stage, whereas, when the printing is to be conducted with the ink ribbon in the ink ribbon cassette of the lower stage, the cams are shifted to the cam position P6 in FIG. 4. Thereafter, the thermal head 18 is pressed against the platen 5 through the ink ribbon and the recording sheet 4. In this state, the heat-generating resistance elements on the thermal head 18 are selectively energized by the thermal head driver THD in accordance with the recording information, while moving the carriage 14. In consequence, he heat-fusible ink applied to the ink ribbon is fused to be transferred to the recording sheet 4, thus printing the demarcated region of the text while the ink ribbon is taken up.

The detail of error detection conducted in Step 403 will be described later.

After executing the printing of the designated region in Step 403, the carriage 14 is stopped and the thermal head 18 is set up (head-up operation) followed by dismissal of the ribbon take-up function. The process then proceeds to Step 404.

As stated before, when the color not printed is judged to be a multi-color in the question posed in Step 401, the process proceeds to Step 405 in which the cassette-up/down operation is conducted to bring the ink ribbon cassette having the designated multi-color ink ribbon to the printing position.

The process then proceeds to Step 406 in which a judgment is conducted as to whether the multi-color to be printed includes the present multi-color ribbon set color (MRS).

If the answer is YES, i.e., if the present multi-color ribbon set color (MRS) is included in the multi-color to be printed, the process proceeds to Step 407, whereas, if the answer is NO, the process proceeds to Step 408.

For instance, when the MRS is the color A, a judgment is conducted in Step 406 as to whether or not the color A is included in the multi-color to be printed.

The searching of the color index on the multi-color ribbon is not conducted in the period immediately after the turning on of the power supply. In addition, the multicolor ribbon set color (MRS) is set as being "not decided" in Step 105 of the power-on sequence which was described before in connection with FIG. 17. In this case, therefore, the process proceeds to Step 408.

In Step 407 mentioned above, a judgment is conducted as to whether the length of the multi-color ribbon to be consumed by the printing of the designated region of the text is smaller than the length of remaining portion of the multi-color ribbon. In such a case, the process proceeds to Step 413 so as to start the printing.

If the answer to the question posed in Step 407 is NO, i.e., if the length of the multi-color ribbon to be consumed by the printing of the designated region of the text is greater than the length of remaining portion of the multi-color ribbon, the printing will result in that the ink ribbon will be fed beyond the length of the ribbon region of the designated color. In such a case, therefore, the printing is not conducted and the process proceeds to Step 408.

In Step 408, a judgment is conducted as to whether the color next to the multi-color ribbon set color (MRS) is included in the multi-color to be printed. For instance, when the MRS is the color A, a judgment is conducted as to whether or not the color B is included in the multi-color to be printed. If the answer is YES, the process proceeds to Step 409, whereas, if the answer is NO, the process proceeds to Step 410.

In Step 409, an operation is performed to search for the index of the next color, e.g., the color B. This searching operation will be described later in more detail. In Step 409, however, it is to be noted that the multi-color ribbon set color (MRS) is changed to the next color, e.g., the color B, while the multi-color ribbon remaining length (MRL) is altered to m. Thereafter, the process proceeds to Step 413, so that printing is executed in the next color, e.g., the color B.

The multi-color ribbon remaining length MRL is determined in accordance with the length l of the ink ribbon as illustrated in FIG. 15.

In Step 410, a judgment is conducted as to whether the color which is next to the next to the present multi-color ribbon set color (MRS) exists in the multi-color to be printed. For instance, when the MRS is the color A, a judgment is conducted as to whether or not the color C is included in the multi-color to be printed. If the answer is YES, the process proceeds to Step 411, whereas, if the answer is NO, the process proceeds to Step 412.

In Step 411, an operation is performed to search for the index of the next to the next color, e.g., the color C. In this Step 411, the multi-color ribbon set color (MRS) is changed to the next to the next color, e.g., the color C, while the multi-color ribbon remaining length (MRL) is altered to m. Thereafter, the process proceeds to Step 413, so that printing is executed in the next to the next color, e.g., the color C.

In Step 412, an operation is performed to search for the index of the next to the next to the next color, e.g., the color A. In this Step 411, the multi-color ribbon set color (MRS) is changed to the next to the next to the next color, e.g., the color A, while the multi-color ribbon remaining length (MRL) is altered to m. Thereafter, the process proceeds to Step 413, so that printing is executed in the next to the next to the next color, e.g., the color A.

In Step 413, the portion of the designated region of the same color as the multi-color ribbon set color (MRS) is printed. Namely, the carriage motor M2 is driven to move the carriage 14 to the designated printing position and the head motor M3 is operated to effect the head-down operation so as to set the thermal head 18 down, while the ribbon take-up function is put into effect. Then, while the carriage 14 is being moved, the heat-generating resistance elements on the thermal head 18 are selectively energized by the thermal head driver THD in accordance with the printing information, thereby to selectively melt the heat-fusible ink on the ink ribbon so that the ink is selectively transferred to the recording sheet 4, while the ink ribbon is being taken up, thus printing the above-mentioned portion of the designated region of the text in the desired color.

The error detecting operation conducted in Step 413 will be explained later.

After the printing of the designated region of the text, the carriage 14 is made to stop and the thermal head 18 is set up (head-up operation), while the ribbon take-up function is dismissed. Then, the length of the multi-color ribbon consumed in the printing is subtracted from the multi-color ribbon remaining length (MRL). Thereafter, the process proceeds to Step 404.

In Step 404, a judgment is conducted as to whether there is any color which has not been printed yet, i.e., any color which is to be printed next. If there is any color, i.e., if the answer is YES, the process returns to Step 401. Conversely, if the answer is NO, the printing process is finished. Thus, the present invention enables an efficient use of the multi-ink ribbon, by virtue of elimination of the wasteful take-up of the same.

According to the invention, it is possible to further economize the multi-color ribbon by storing information concerning the color and the region which have not been printed yet, and then executing the following process.

In the sequence shown in the flow chart of FIG. 22, the process proceeds from Step 407 to Step 408, if the judgment in Step 407 has shown that the length of the multi-color ink ribbon to be consumed in the printing of the designated region is greater than the remaining length of the multi-color ribbon, i.e., when the answer is NO. This, however, is not exclusive and the sequence may be modified such that the printing is executed to completely consume the remaining length of the multi-color ribbon while counting down the remaining length in accordance with the consumption so as to stop the printing when the remaining length has been reduced to zero, the process being then advanced to Step 408.

The operation in Step 404 may be modified such that judgment is conducted as to whether there is any color which has not been printed yet, as well as any region of the text which has not been printed yet. If there is no color nor region to be printed next, the printing process is finished, whereas, if there is any, the process returns to Step 401.

In consequence, the multi-ink ribbon is always used in the state that there is no remaining length in each color region, whereby the efficiency of the ribbon consumption is further improved as compared to the process explained before in connection with the flow chart shown in FIG. 22.

Figure 23:
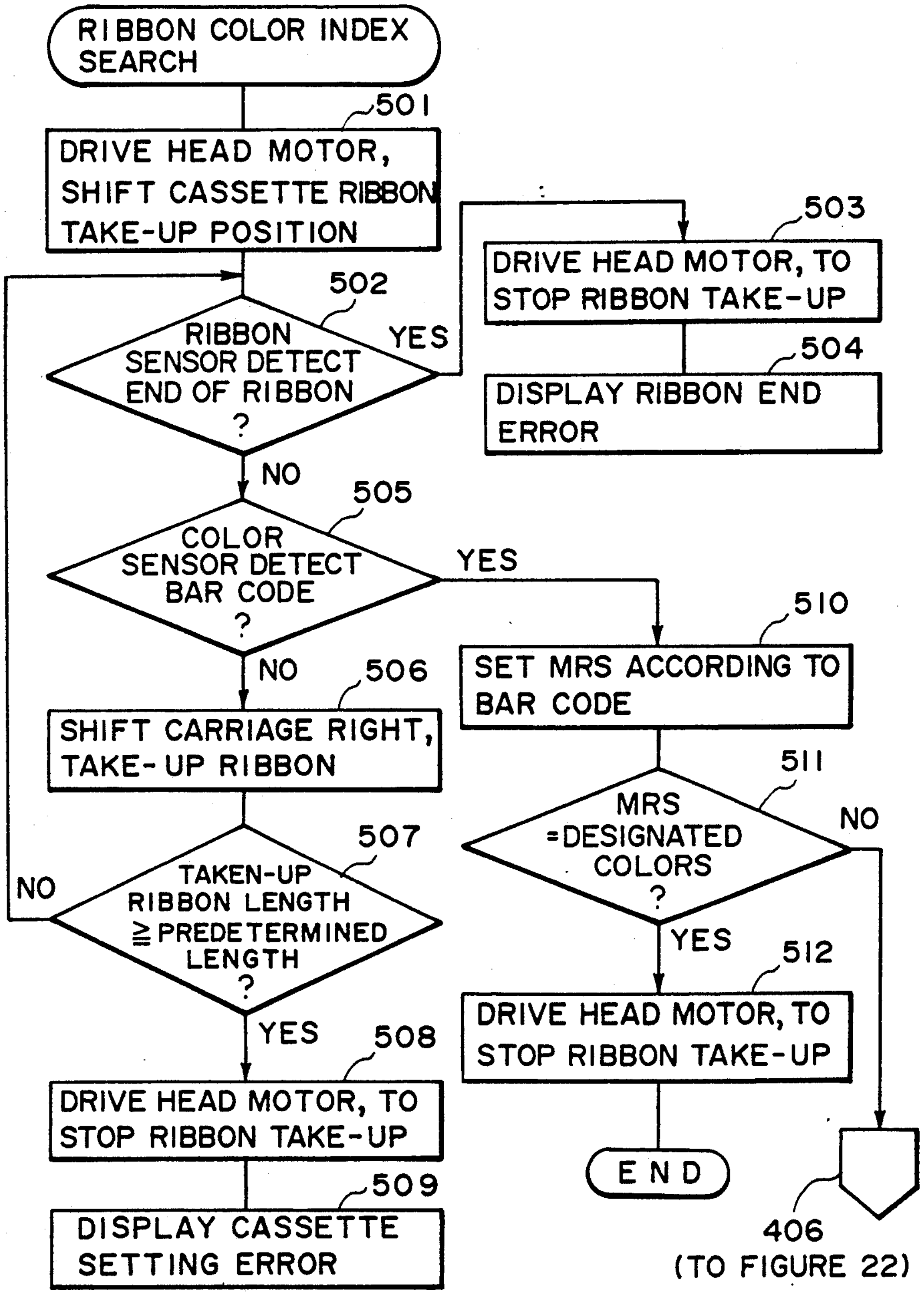
FIG. 23 is a flow chart illustrating a process of ribbon color index search shown in FIG. 22.

A description will be made hereinunder as to the operation for searching the color index of the designated color on the multi-color ribbon which has successive regions of different colors, with reference to FIG. 23 showing a flow chart of a process for searching the color index of the desired color. The searching is actually executed by detecting the bar code portions 50*a*, 50*b* and 50*c* on the multi-color ribbon 50 by means of the color sensor S3, in a manner which will be explained hereinunder.

Referring to FIG. 23, the head motor M3 is driven in Step 501 so as to put the ribbon take-up function into effect. Namely, the cams are shifted to the position P2 in the cam chart of FIG. 4 when the cassette of the upper stage has been selected (cassette-down state), whereas, when the cassette of the lower stage has been selected (cassette-down state), the cams are shifted to the position P5 in the cam chart of FIG. 4.

Then, in Step 502, a judgment is conducted in accordance with the signal from the ribbon sensor S2 capable of detecting ribbon-end state, as to whether the present state is not the ribbon-end state. In case of the ribbon-end state, the process proceeds to Step 503 in which the head motor M3 operates to dismiss the ribbon take-up function. Namely, the cams are shifted to the cam position P3 or P4 in the cam chart of FIG. 4, and then the process proceeds to Step 504 in which a display is conducted to inform the operator of the ribbon-end state.

In Step 502, if the present state is not the ribbon-end state, the process proceeds to Step 505 in which a judgment is conducted as to whether a bar code has been detected by the color sensor S3.

If the answer is NO, i.e., if no bar code has been detected, the process proceeds to Step 506 in which a carriage motor M2 is driven so as to shift the carriage 14 in the recording direction, i.e., to the right, thereby taking up the multi-color ink ribbon 50. The process then proceeds to Step 507 where a judgment is conducted as to whether the length of the ribbon taken up has exceeded a predetermined take-up length l (see FIG. 15). If the length l has not been exceeded, the process returns to Step 502 in which the color sensing operation is continued while the ribbon is taken up.

In Step 507, if the answer is YES, i.e., if the length l has been exceeded, the presently used ink ribbon is judged as being a monochromatic ink ribbon 49 rather than a multi-color ink ribbon 50. In this case, therefore, the process proceeds to Step 508 in which the head motor M3 is driven to shift the cams to the position for dismissing the ribbon take-up function. Then, the process proceeds to Step 509 in which a display is conducted to inform the operator of the cassette selection error.

In Step 505, if the answer is YES, i.e., if the bar code is detected by the color sensor S3, the process proceeds to Step 510 in which the multi-color ribbon set color (MRS) is set in the color corresponding to the bar code.

Subsequently, in Step 511, a judgment is executed as to whether the MRS is the designated color which is to be searched. If the answer is NO, the process returns to Step 406 shown in FIG. 22. This operation is conducted for the purpose of initializing the process because there is no means for detecting what color will be brought to the printing position when the searching operation is conducted in the state in which the MRS has not been definitely decided immediately after turning on the power supply.

If the answer to the question posed in Step 511 is YES, the process proceeds to Step 512 in which the head motor M3 is driven to shift the cams to the position where the ribbon take-up function is dismissed, thus completing the searching of the designated color.

It will be understood that, according to the invention, it is possible to efficiently search the designated color on the multi-color ink ribbon by minimizing the wasteful feed of the ribbon. Furthermore, it is possible to detect any error in the setting of the ink ribbon cassette, e.g., setting of the cassette having the ribbon of a color which is different from the designated color.

Figure 24:
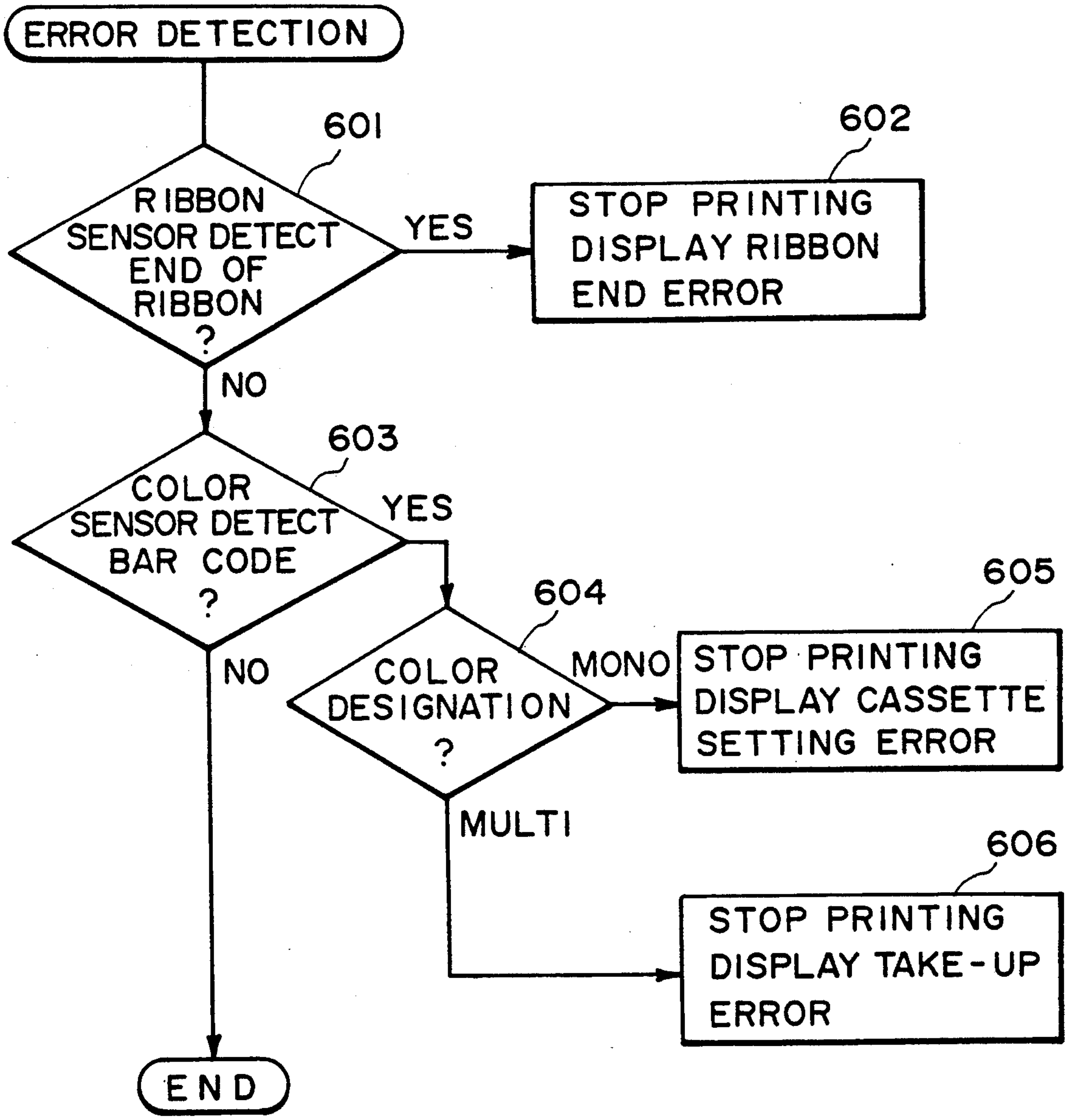
FIG. 24 is a flow chart illustrating a process for detecting an error shown in FIG. 22.

FIG. 24 is a flow chart of the process for detecting any error during the printing, executed in the sequence shown by the flow chart in FIG. 22. The error detecting operation will be explained with specific reference to this Figure.

The error detecting routine is executed during the printing at a predetermined interval, e.g., in response to each of the driving pulses for driving the carriage motor M2, for each of the heat cycles of the thermal head 18, and so forth. Referring to FIG. 24, a judgment is conducted by the ribbon sensor S2 as to whether the present state is a ribbon-end state.

When the ribbon-end state is detected, the process proceeds to Step 602 in which the printing is suspended while stopping the carriage 14. Then, the head motor M3 is started to effect the head-up operation so as to set the thermal head 18 in the up position, while dismissing the ribbon take-up function. Thereafter, the display is conducted to inform the operator of the occurrence of the ribbon-end state.

In Step 601, when the ribbon-end state is not detected, the CPU judges that the present state is an ordinary state, so that the process proceeds to Step 603 in which a judgment is conducted as to whether the bar code is detected by the color sensor S3.

The fact that the bar code is detected means that the bar code portion is heated by the thermal head 18 for printing. The heating of the bar code portion is an extraordinary condition. In such a case, the process proceeds to Step 604.

In Step 604, a judgment is conducted as to whether the designated color is a monochromatic color or multicolor. The fact that the designated color is monochromatic means that the multi-color ink ribbon cassette has been erroneously loaded despite that the monochromatic color has been designated in the printing menu. In this case, therefore, the process proceeds to Step 605 so as to stop the printing, while indicating the cassette setting error on the display.

If the judgment in Step 604 shows that the designated color is the multi-color, it is judged that the bar code portion has been wrongly heated for printing though there is no error in the setting of the cassette In such a case, the process proceeds to Step 606 so as to stop the printing while indicating occurrence of the ribbon take-up error on the display.

When no bar code is detected in Step 603, i.e., when the answer is NO, the CPU judges that the printing is being executed correctly, thus completing the error detecting operation.

The indication of occurrence of an error is conducted typically by means of a CRT, but the invention does not exclude the use of any other suitable indicating means such as activation of a buzzer or lighting up of a warning lamp.

It is thus possible to detect any error occurring during the printing, by executing the error detection routine explained in connection with FIG. 24.

In the described embodiment, the recording medium may be a recording paper such as a copy paper, a transparent plastic sheet used in overhead projectors, and so forth.

The heating of the ink ribbon, which is effected in the described embodiment by the thermal head 18, maybe effected by any other suitable heating means such as infrared rays or a laser beam.

Figure 25:
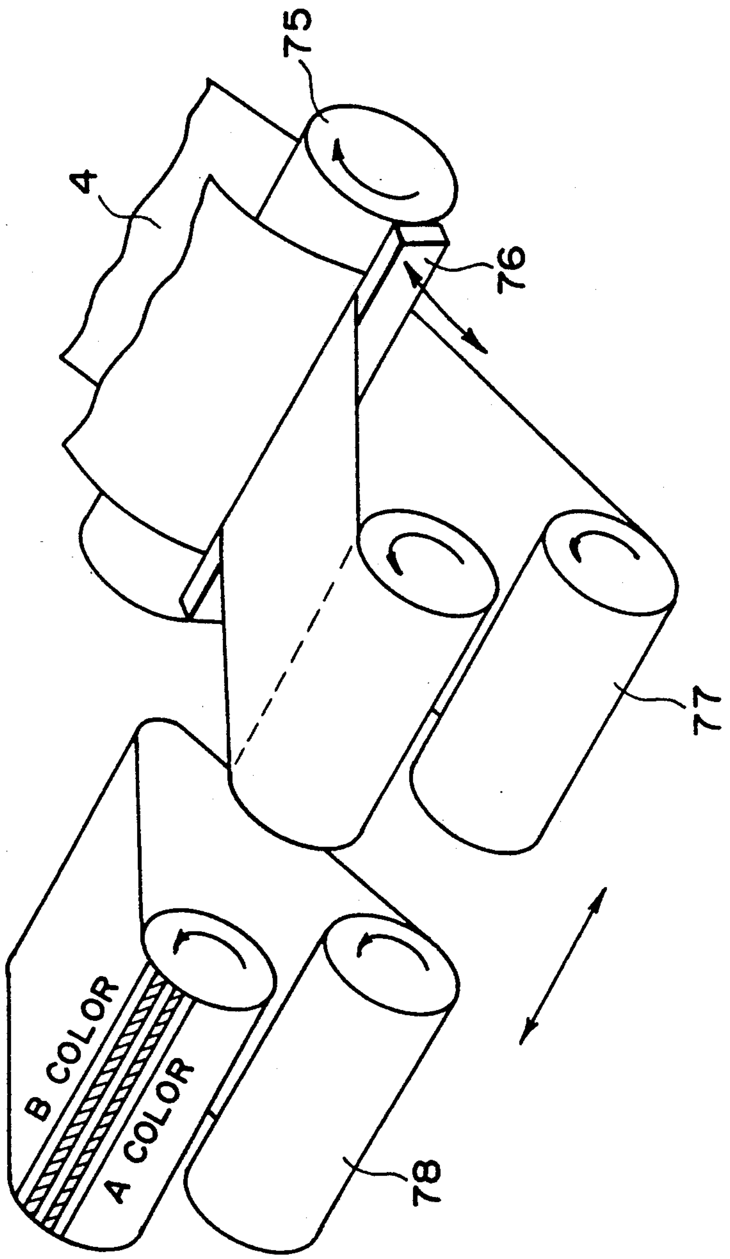
FIG. 25 is a perspective view of a recording portion of a full-line type recording apparatus of the present invention.

It is also to be noted that the printing apparatus of the invention may be realized in the form of a full-line printing type having a heating means such as a thermal head extending over the entire length of the print line as shown in FIG. 25, though the printing apparatus of the described embodiment is of serial printing type in which the thermal head 18 is moved reciprocally along the recording sheet in the recording direction.

More specifically, in FIG. 25, a reference numeral 4 denotes a recording sheet, 75 designates a platen, 76 designates a full-line type thermal head, 77 designates a full-line type monochromatic ink ribbon sheet, and 78 designates a full-line type multi-ink ribbon sheet. Thus, the arrangement is basically the same as that in the embodiment described before.

Furthermore, the recording apparatus of the invention can be embodied in such a manner that the ink ribbon cassette is kept stationary, though the ink ribbon cassette in the described embodiment is carried by the carriage 14 so as to be moved reciprocally.

Needless to say, the stack of cassette may be constituted by three of more ink ribbon cassettes, as well as by two ink ribbon cassettes as in the described embodiment.

Similarly, the multi-color ink ribbon, which has successive regions of three different colors demarcated by bar codes, may be substituted by a ribbon having successive regions of two colors or four or more colors. Even a multi-color ink ribbon having a multiplicity of layers of ink applied to the base film can be used successfully. Thus, the recording apparatus of the present invention can be carried out regardless of the type of the muti-color ink ribbon.

The platen used in the recording apparatus of the invention may be a flat tabular platen or a cylindrical platen which also serves as a sheet feeding roller. Although the description has been made as to the case where the printing is effected thermally by, for example, the thermal head, this is not exclusive and the present invention can be applied to all types of printing apparatus which makes use of the ink ribbon, e.g., an impact type printer which has a wire-dot type printhead.

Obviously, the described embodiment may be modified such that the ink ribbon cassette having black ink ribbon is placed in the lower stage of the stack of the cassettes while the multi-color ink ribbon cassette is placed in the upper stage of the stack, though a reversed cassette arrangement has been described. It is also possible arrange such that the apparatus can operate regardless of whether the multi-color ink ribbon cassette is set in the upper or lower stage, by free selection of the cassette through the designation on the printing menu.

As will be understood from the foregoing description, according to the present invention, there is provided an ink ribbon cassette which is adapted to be detachably loaded on a recording apparatus having a recording head capable of recording information on a recording medium supported by a platen, the ink ribbon cassette comprising a substantially box-shaped casing constituted by an upper case and a lower case which are connected to each other at their vertical walls, the casing having a first side wall facing the platen and a second side wall opposing the first side wall, a recessed portion formed in one end of the first side wall and capable of receiving the recording head, engaging portion provided on the second side wall and adapted for engagement with retaining member on the recording apparatus, a pair of through holes constituted by pairs of apertures formed in the portions of the upper and lower cases adjacent to the first side wall, the through holes being adapted for receiving locating members on the recording apparatus so as to locate the ink ribbon cassette, and a path of an ink ribbon extended along the first side wall so as to avert from the pair of through holes.

With this arrangement, it becomes possible to design the ink ribbon cassette such that the first side wall of the cassette is positioned close to the platen, and to set the feed path of the ink ribbon in the close proximity of the inner surface of the first side wall of the cassette, thus contributing to the reduction in the size of the ink ribbon and the recording apparatus.

In addition, since the cassette is set by means of the engaging portion on the second side wall thereof and the through holes, a plurality of ink ribbon cassettes can be stacked and located by common retaining and locating means. Thus, the cassettes of the same size and design can be used for different types of ink ribbon in the stack of the ink ribbon cassettes.

The invention also provides a recording apparatus for recording information on a recording medium: supported by a platen by means of a recording head with an ink ribbon set on one of a plurality of ink ribbon cassettes which are stacked in stages, the recording apparatus comprising: a base member for carrying the stack of ink ribbon cassettes, each of the ink ribbon cassette having the construction stated above; a pair of locating members projected from the base member and adapted to be received in the pair of through holes; and engaging members projected from the base member and provided at their ends with claws for engagement with the engaging portion of the casing; whereby the ink ribbon cassettes of the stack are located and held by common locating members.

This recording apparatus provides the same advantages as that offered by the ink ribbon cassette mentioned above.

The invention also provides an ink ribbon cassette adapted to be detachably loaded on a recording apparatus having a recording head, comprising: a recessed portion formed along the path of feed of an ink ribbon fed from a supply end to a take-up end, the recessed portion being capable of receiving the recording head; a pair of frictioning means disposed on both sides of the recessed portion along the path of feed of the ink ribbon and capable of imparting friction to the ink ribbon; and urging means provided between the frictioning means and disposed in the path of feed of the ink ribbon so as to impart a tension to the ink ribbon.

With this arrangement, it is possible to feed the ink ribbon with a moderate constant tension and without any slack, thus preventing damaging of the ink ribbon and ensuring high quality of the recorded image.

The invention also provides a recording apparatus for recording information on a recording medium supported by a platen by means of a recording head with an ink ribbon set on selected one of a plurality of ink ribbon cassettes which are loaded on the recording apparatus, the recording apparatus comprising: supporting means for supporting a plurality of the ink ribbon cassettes stacked one on another and capable of vertically shifting the stack of ink ribbon cassettes, each of the ink ribbon cassettes having a recessed portion formed along the path of feed of an ink ribbon fed from a supply end to a take-up end, the recessed portion being capable of receiving the recording head, a pair of frictioning means disposed on both sides of the recessed portion along the path of feed of the ink ribbon and capable of imparting friction to the ink ribbon, and urging means provided between the frictioning means and disposed in the path of feed of the ink ribbon so as to impart a tension to the ink ribbon; and driving means for driving the supporting means in the direction of stack of the ink ribbon cassettes so as to bring the selected one of the ink ribbon cassettes to a position where it faces the recording head.

This arrangement realizes a multi-stage cassette type recording apparatus in which the ink ribbon in the operating cassette can be fed with moderate constant tension without any slack, while avoiding damaging of the ink ribbon and stably ensuring a high quality of the recorded image.

The invention also provides an ink ribbon cassette adapted to be detachably loaded on a recording apparatus having a recording head, comprising: a recessed portion formed along the path of fed of an ink ribbon which is fed from a supply end to a take-up end, the recessed portion being capable of receiving the recording head; and a cantilevered spring member disposed at an intermediate portion of the path of feed of the ink ribbon, the spring member being provided at its free end with a frictioning portion and is bent at its intermediate portion such that the supported end and the free end thereof face each other, so as to impart a smaller tension to the ink ribbon when the ink ribbon is fed from the supply end to the take-up end, while imparting a greater tension to the ink ribbon when the ink ribbon is moved from the take-up end towards the supply end.

The invention also provides a recording apparatus in which a recording color detecting region is disposed downstream from the recording operation region as viewed in the direction of feed of the ink ribbon, so as to detect the color of the portion of the multi-color ink ribbon in the recording operation region. It is therefore possible to accurately set the desired color portion of the multi-color ink ribbon in the recording position. In addition, wasteful feed of the ink ribbon for positioning the desired color portion in the recording position can be eliminated. At the same time, the searching of the desired color on the multicolor ink ribbon can be effected at a high speed and without fail.

In addition, any erroneous feed of the ink ribbon such as positioning of the color index portion of the multi-color ink ribbon can be detected without fail by the color detecting function explained above. Thus, any wrong feeding of the ink ribbon can be detected in a very simple way.

What is claimed is:

1. An ink ribbon cassette which is adapted to be detachably loaded on a recording apparatus having a recording head capable of recording information on a recording medium supported by a platen, said ink ribbon cassette comprising a substantially box-shaped casing having by an upper case and a lower case which are connected to each other at their vertical walls, said casing having a first side wall facing said platen and a second side wall opposing said first side wall, a recessed portion formed in one end of said first side wall and capable of receiving said recording head, engaging portion provided on said second side wall and adapted for engagement with retaining member on said recording apparatus, a pair of through holes constituted by pairs of apertures formed in the portions of said upper and lower cases adjacent to said first side wall, said through holes being adapted for receiving locating members on said recording apparatus so as to locate said ink ribbon cassette, and an ink ribbon extended along said first side wall so as to avert said ink ribbon from said pair of through holes.

2. An ink ribbon cassette according to claim 1, further comprising guide members for guiding said ink ribbon such that said ink ribbon runs through regions between said first side wall and said pair of through holes.

3. An ink ribbon cassette according to claim 1, wherein each of said pair of through holes has a substantially rectangular form.

4. An ink ribbon cassette according to claim 1, wherein said casing has a substantially rectangular form with said pair of through holes disposed in the vicinity of two corners of said casing adjacent to said first side wall.

5. An ink ribbon cassette according to claim 1, wherein said recessed portion in the first side wall is formed along the path of feed of said ink ribbon feed from a supply end to a take-up end.

6. An ink ribbon cassette detachable to a body of a recording apparatus, said cassette comprising;

a housing member having a first member, a second member provided opposite to said first member and a side plate provided between said first and second members;

a first and a second winding member provided in said housing member capable of winding said ink ribbon;

an ink ribbon provided so as to be exposed outside of said housing member at a part of a route from said first winding member to said second winding member;

an engaging section provided on a side edge opposed to a portion where said ink ribbon is exposed;

a first opening provided on said first member; and a second opening provided on said second member opposite to and aligned with said first opening.

7. An ink ribbon cassette detachable to a body of a recording apparatus, said cassette comprising;

a cassette body;

an ink ribbon provided on said cassette body;

a first and second winding members capable of winding said ink ribbon;

an engaging section provided on said cassette body; and a penetrating hole provided on said cassette body.

8. An ink ribbon cassette according to claim 6, wherein said engaging section is locked by locking means provided on said recording apparatus so as to mount said cassette to said recording apparatus.

9. An ink ribbon cassette according to claim 6, wherein said first and second openings are penetrated by a positioning member provided on said recording apparatus to position said cassette when said cassette is mounted on said recording apparatus.

10. An ink ribbon cassette according to claim 7, wherein said engaging section is locked by locking means provided on said recording apparatus so as to mount said cassette to said recording apparatus.

11. An ink ribbon cassette according to claim 7, wherein said penetrating hole is penetrated by a positioning member provided on said recording apparatus to position said cassette when said cassette is mounted on said recording apparatus.

12. An ink ribbon cassette according to claim 7, wherein said penetrating hole is provided on left and right sides of said cassette body.

* * * * *

UNITED STATES PATENT AND TRADEMARK OFFICE
CERTIFICATE OF CORRECTION

PATENT NO. : 5,017,942 Page 1 of 2

DATED : May 21, 1991

INVENTOR(S) : Osamu Asakura, et al.

It is certified that error appears in the above-identified patent and that said Letters Patent is hereby corrected as shown below:

COLUMN 4:

Line 31, "fed" should read --feed--.

COLUMN 10:

Line 22, "fore" should read --force--.

COLUMN 11:

Line 48, "intermediate gear 25C," should read --intermediate gear 26,--.

COLUMN 16:

Line 42, "lower cause 42." should read --lower case 42.--.

COLUMN 17:

Line 38, "external RAM" should read --external ROM--.

COLUMN 27:

Line 40, "fed" should read --feed-.

UNITED STATES PATENT AND TRADEMARK OFFICE

CERTIFICATE OF CORRECTION

PATENT NO. : 5,017,942 Page 2 of 2

DATED : May 21, 1991

INVENTOR(S) : Osamu Asakura, et al.

It is certified that error appears in the above-identified patent and that said Letters Patent is hereby corrected as shown below:

COLUMN 28:

Line 10, "by" should be deleted.

Line 64, "a" should be deleted.

Signed and Sealed this

Sixteenth Day of March, 1993

Attest:

STEPHEN G. KUNIN

*Attesting Officer* *Acting Commissioner of Patents and Trademarks*